US010205645B2

(12) United States Patent
Kato et al.

(10) Patent No.: US 10,205,645 B2
(45) Date of Patent: *Feb. 12, 2019

(54) WIRELESS COMMUNICATION SYSTEM, TERMINAL DEVICE, WIRELESS COMMUNICATION METHOD, INTEGRATED CIRCUIT, AND PROCESSING METHOD

(71) Applicant: SHARP KABUSHIKI KAISHA, Sakai, Osaka (JP)

(72) Inventors: Yasuyuki Kato, Sakai (JP); Katsunari Uemura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,093

(22) Filed: May 18, 2018

(65) Prior Publication Data

US 2018/0270131 A1  Sep. 20, 2018

Related U.S. Application Data

(63) Continuation of application No. 15/126,215, filed as application No. PCT/JP2015/057912 on Mar. 17, 2015, now Pat. No. 9,998,345.

(30) Foreign Application Priority Data

Mar. 18, 2014 (JP) ................................ 2014-054947

(51) Int. Cl.
*H04W 24/00* (2009.01)
*H04L 12/26* (2006.01)
(Continued)

(52) U.S. Cl.
CPC ...... *H04L 43/0811* (2013.01); *H04L 41/0677* (2013.01); *H04W 72/042* (2013.01);
(Continued)

(58) Field of Classification Search
CPC ... H04W 76/025; H04W 88/06; H04W 36/28; H04W 76/026; H04W 28/08;
(Continued)

(56) References Cited

U.S. PATENT DOCUMENTS 9,998,345 B2 * 6/2018 Kato ..................... H04W 76/18
2014/0269632 A1 9/2014 Blankenship et al.
(Continued)

FOREIGN PATENT DOCUMENTS

WO   WO 2010/017376 A1   2/2010

OTHER PUBLICATIONS

"3rd Generation Partnership Project; Technical Specification Group Radio Access Network; Study on Small Cell enhancements for E-UTRA & E-UTRAN; Higher layer aspects (Release 12)", 3GPP TR 36.842, France; vol. RAN WG2, No. V12.0.0 XP050729403, pp. 1-71, retrieved Jan. 7, 2014.

(Continued)

*Primary Examiner* — Nimesh Patel
(74) *Attorney, Agent, or Firm* — Birch, Stewart, Kolasch & Birch, LLP

(57) ABSTRACT

Provided is a wireless communication system in which a first base station apparatus and a second base station apparatus perform communication with a terminal device, in which the first base station apparatus transmits radio resource configuration information including radio bearer configuration information of the first base station apparatus or the second base station apparatus, to the terminal device, in which the terminal device receives the radio resource configuration information, in which, in a case where an RLC failure with respect to the first base station apparatus is detected, the terminal device executes a re-establishment procedure, and in which, in a case where an RLC failure with respect to the second base station apparatus is detected, (Continued)

the terminal device transmits to the first base station apparatus a message indicating that an RLC failure with respect to the second base station apparatus is detected, and suspends the radio bearer for the second base station apparatus.

3 Claims, 11 Drawing Sheets

(51) Int. Cl.
  *H04W 76/15* (2018.01)
  *H04L 12/24* (2006.01)
  *H04W 76/18* (2018.01)
  *H04W 72/04* (2009.01)
(52) U.S. Cl.
  CPC .......... *H04W 76/15* (2018.02); *H04W 76/18* (2018.02); *H04W 72/04* (2013.01)
(58) Field of Classification Search
  CPC ......... H04W 36/0055; H04W 72/0413; H04W 72/042; H04W 76/046; H04W 48/16; H04W 76/021; H04W 84/045; H04W 88/16; H04W 16/32; H04W 28/0252; H04W 76/028; H04W 88/02; H04W 36/0083; H04W 28/0247; H04W 36/0066; H04W 40/248; H04W 76/06; H04W 88/10; H04L 5/001; H04L 5/0053; H04L 41/0813
  See application file for complete search history.

(56) References Cited

U.S. PATENT DOCUMENTS

| | | |
|---|---|---|
| 2015/0208235 A1 | 7/2015 | Ingale et al. |
| 2016/0057802 A1 | 2/2016 | Lee et al. |
| 2016/0277987 A1 | 9/2016 | Chen et al. |

OTHER PUBLICATIONS

3GPP TR 36.842 V1.0.0, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", Technical Report, Nov. 2013 68 pages.

3GPP TS 36.300 V11.7.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Technical Specification, Sep. 2013 209 pages.

Ericsson: "RLF handling in dual connectivity", 3GPP Draft; R2-140655 RLF Handling in Dual connectivity, 3rd (3GPP); France, vol. RAN WG2, No. Prague, Czech Republic, XP050737787, URL:http://www.3gpp.org/ftp/Meetings_3GPP_SYNC/RAN/RAN2/Docs/ retrieved Feb. 9, 2014.

LG Electronics Inc., "Handling of Radio Link Problem in SCG SCells", 3GPP TSG-RAN2 Meeting #84, R2-140734, Feb. 1, 2014, 4 pages.

Non-Final Office Action dated Aug. 17, 2017, issued in copending U.S. Appl. No. 15/126,215.

Notice of Allowance dated Feb. 13, 2018, issued in copending U.S. Appl. No. 15/126,215.

NTT DOCOMO et al.: "Introduction of Dual Connectivity", 3GPP Draft R2-140906_(3GPP), Route Des Lucioles; France, vol. RAN WG2, No. Prague, Czech Republic; XP050770936, URL: http:/www.3gpp.org/ftp/tsg_ran/WG2_RL2/TSGR2_85/Docs/ retrieved Feb. 22, 2014.

ZTE, "MAC layer modelling issue", 3GPP TSG-RAN2 Meeting #84, R2-133906, Nov. 1, 2013, 4 pages.

* cited by examiner

WIRELESS COMMUNICATION SYSTEM, TERMINAL DEVICE, WIRELESS COMMUNICATION METHOD, INTEGRATED CIRCUIT, AND PROCESSING METHOD

CROSS-REFERENCE TO RELATED APPLICATIONS

This application is a Continuation of copending application Ser. No. 15/126,215, filed on Sep. 14, 2016, which was filed as PCT International Application No. PCT/JP2015/057912 on Mar. 17, 2015, which claims the benefit under 35 U.S.C. § 119(a) to Patent Application No. 2014-054947, filed in Japan on Mar. 18, 2014, all of which are hereby expressly incorporated by reference into the present application.

TECHNICAL FIELD

The present invention relates to a wireless communication system, a base station apparatus, and a terminal device, and more particularly to a wireless communication system, a base station apparatus, a terminal device, a wireless communication method, and an integrated circuit, all of which relate to data control.

This application claims the benefit of Japanese Priority Patent Application No. 2014-054947 filed on Mar. 18, 2014, the entire contents of which are incorporated herein by reference.

BACKGROUND ART

In the 3rd Generation Partnership Project (3GPP), a W-CDMA scheme has been standardized as a third generation cellular mobile communication system, and is in service. Furthermore, HSDPA in which communication speed is further increased has been standardized as well and is in service.

On the other hand, in 3GPP, standardization of Evolved Universal Terrestrial Radio Access (which is hereinafter referred to as "EUTRA") has been performed as well and has started to be in service. As a downlink communication scheme for EUTRA, an Orthogonal Frequency Division Multiplexing (OFDM) scheme, which is highly resistant to multi-path interference and is suitable for high-speed transfer, is employed. Furthermore, as an uplink communication scheme, a Discrete Fourier Transform (DFT)-spread OFDM scheme for Single Carrier-Frequency Division Multiple Access (SC-FDMA) that is capable of reducing a Peak to Average Power Ratio (PAPR) for a transmission signal is employed considering the cost of and power consumption by a mobile station apparatus.

Furthermore, in 3GPP, Advanced-EUTRA that is a further advanced version of EUTRA has been started to be studied as well. It is assumed that in Advanced-EUTRA, a band up to a maximum bandwidth of 100 MHz is used in each of the uplink and the downlink, and that communication is performed to the maximum at a transfer rate of 1 Gbps or more in the downlink and at a transfer rate of 500 Mbps or more in the uplink.

It is considered that in Advanced-EUTRA, multiple bands that are compatible with EUTRA are aggregated in such a manner that the mobile station apparatus for EUTRA can be accommodated as well, and thus a maximum band of 100 MHz is realized. Moreover, in Advanced-EUTRA, one band of 20 MHz or less for EUTRA is referred to as a Component Carrier (CC). The component carrier is also referred to a cell. Furthermore, the aggregating of bands of 20 MHz or less is referred to as Carrier Aggregation (CA) (NPL 1).

Furthermore, in Advanced-EUTRA, it is considered that the Carrier Aggregation is performed within a frequency or between frequencies in a Macro Cell and a Small Cell within a range of the Macro Cell. Being within the range of the Macro Cell includes frequencies being different from each other. In NPL 2, it is proposed that in communication between a base station apparatus and the mobile station apparatus at the time of the Carrier Aggregation in the Macro Cell and the Small Cell, control information (Control-Plane Information) is transmitted in the Macro Cell and user information (User-Plane Information) is transmitted in the Small Cell. The Carrier Aggregation in the Macro Cell and the Small Cell that is illustrated in NPL 2 is also referred to as Dual Connect (or Dual. Connectivity).

Moreover, it is also considered that, with the Dual Connect, information on the same radio bearer (RB) is transmitted from the base station apparatus in the Macro Cell and the base station apparatus in the Small Cell to the mobile station apparatus and the information on the same radio bearer (RB) is transmitted from the mobile station apparatus to the base station apparatus in the Macro Cell and the base station apparatus in the Small Cell. Moreover, control in which the base station apparatus and the mobile station apparatus transmit and receive the information on the same radio bearer through different base station apparatuses is referred to as Bearer Split.

CITATION LIST

Non Patent Literature

NPL 1: 3GPP TS (Technical Specification) 36.300, V11.7.0 (2013 September), Evolved Universal Terrestrial Radio Access (E-UTRA) and Evolved Universal Terrestrial Radio Access Network (E-UTRAN), Overall description Stage 2

NPL 2: 3GPP TR (Technical Report) 36.842, V1.0.0 (2013 November), Study on Small Cell Enhancements for E-UTRA and E-UTRAN-Higher layer aspects (release 12)

DISCLOSURE OF THE INVENTION

Problems to be Solved by the Invention

However, in the communication between the base station apparatus and the mobile station apparatus as illustrated in NPL 2, in a case where the Bearer Split is performed between the base station apparatus in the Macro Cell and the base station apparatus in the Small Cell, and the mobile station apparatus, and where data transmission and reception is performed, if control is not performed in which a suitable cell is selected and the data transmission and reception are performed, data throughput is decreased.

Particularly, in a case where the Bearer Split is performed on uplink data from the mobile station apparatus to the base station apparatus in the Macro Cell and the base station apparatus in the Small Cell, the mobile station apparatus has to suitably select a cell in which to transmit data. Furthermore, even in a case where it is difficult for the mobile station apparatus to communicate with one of the base station apparatuses, the communication has to continue.

Several aspects of the present invention are provided in view of this situation. An object of the present invention is to provide a wireless communication system, a mobile station apparatus, a wireless communication method, an integrated circuit, and a processing method, in each of which it is possible that the mobile station apparatus efficiently performs the data transmission processing at the time of the Bearer Split for Dual Connect.

Means for Solving the Problems (1) In order to accomplish the object described above, the following means are contrived according to several aspects of the present invention. That is, according to a first aspect of the present invention, there is provided a wireless communication system in which a first base station apparatus and a second base station apparatus perform communication with a terminal device, in which the first base station apparatus transmits radio resource configuration information including radio bearer configuration information of the first base station apparatus or the second base station apparatus, to the terminal device, in which the terminal device receives the radio resource configuration information, in which, in a case where an RLC failure with respect to the first base station apparatus is detected, the terminal device executes a re-establishment procedure, and in which, in a case where an RLC failure with respect to the second base station apparatus is detected, the terminal device transmits to the first base station apparatus a message indicating that an RLC failure with respect to the second base station apparatus is detected, and suspends the radio bearer for the second base station apparatus.

(2) According to a second aspect of the present invention, there is provided a terminal device that performs communication with a first base station apparatus and a second base station apparatus, the terminal device receiving radio resource configuration information that includes radio bearer configuration information, from the first base station apparatus; transmitting to the first base station apparatus a message indicating that an RLC failure with respect to the second base station apparatus is detected, in a case where an RLC failure with respect to the second base station apparatus is detected; and suspending the radio bearer for the second base station apparatus.

(3) The terminal device according to the second aspect of the present invention may initialize a parameter for the second base station apparatus, in a case where an RLC failure with respect to the second base station apparatus is detected.

(4) According to a third aspect of the present invention, there is provided a wireless communication method that is applied to a wireless communication system in which a first base station apparatus and a second base station apparatus perform communication with a terminal device, the wireless communication method including: a step of causing the first base station apparatus to transmit radio resource configuration information including radio bearer configuration information of the first base station apparatus or the second base station apparatus, to the terminal device; a step of causing the terminal device to receive the radio resource configuration information; a step of causing the terminal device to execute a re-establishment procedure, in a case where an RLC failure with respect to the first base station apparatus is detected; and a step of causing the terminal device to transmit to the first base station apparatus a message indicating that an RLC failure with respect to the second base station apparatus is detected, and of suspending the radio bearer for the second base station apparatus, in a case where an RLC failure with respect to the second base station apparatus is detected.

(5) According to a fourth aspect of the present invention, there is provided an integrated circuit that is applied to a terminal device that performs communication with a first base station apparatus and a second base station apparatus, the integrated circuit including: means for receiving radio resource configuration information including radio bearer configuration information from the first base station apparatus; means for transmitting to the first base station apparatus a message indicating that an RLC failure with respect to the second base station apparatus is detected, in a case where an RLC failure with respect to the second base station apparatus is detected; and means for suspending the radio bearer for the second base station apparatus.

(6) According to a fifth aspect of the present invention, there is provided a processing method in a terminal device that performs communication with a first base station apparatus and a second base station apparatus, the processing method including: receiving radio resource configuration information that includes radio bearer configuration information, from the first base station apparatus; transmitting to the first base station apparatus a message indicating that an RLC failure with respect to the second base station apparatus is detected, in a case where an RLC failure with respect to the second base station apparatus is detected; and suspending the radio bearer for the second base station apparatus.

(7) According to a sixth aspect of the present invention, there is provided a terminal device that performs communication with a first base station apparatus and a second base station apparatus through a cell in a master cell group that belongs to the first base station apparatus and a cell in a secondary cell group that belongs to the second base station apparatus, the terminal device including: an RRC layer that creates a message indicating an RLC failure with respect to the secondary cell group, in a case where an RLC failure is notified by an RLC layer that corresponds to the secondary cell group, and performs MAC reset of the MAC layer.

(8) According to a seventh aspect of the present invention, there is provided a processing method in a terminal device that performs communication with a first base station apparatus and a second base station apparatus through a cell in a master cell group that belongs to the first base station apparatus and a cell in a secondary cell group that belongs to the second base station apparatus, the processing method including: causing an RRC layer to create a message indicating a random access failure with respect to the secondary cell group, in a case where an RLC failure is notified by an RLC layer that corresponds to the secondary cell group, and to perform MAC reset of the MAC layer.

(9) According to an eighth aspect of the present invention, there is provided an integrated circuit that is applied to a terminal device that performs communication with a first base station apparatus and a second base station apparatus through a cell in a master cell group that belongs to the first base station apparatus and a cell in a secondary cell group that belongs to the second base station apparatus, the integrated circuit including: means for causing an RRC layer to create a message indicating an RLC failure with respect to the secondary cell group in a case where the random access failure is notified by an RLC layer that corresponds to the secondary cell group; and means for causing the RRC layer to perform MAC reset of the MAC layer.

Effects of the Invention

According to several aspects of the present invention, a mobile station apparatus is capable of performing efficient data transmission to a base station apparatus in a Macro Cell and a base station apparatus in a Small Cell.

MODE FOR CARRYING OUT THE INVENTION

An OFDM scheme is employed as for downlink for EUTRA. Furthermore, a single carrier communication scheme that is a DFT-spread OFDM scheme is employed as uplink for EUTRA.

Figure 6:
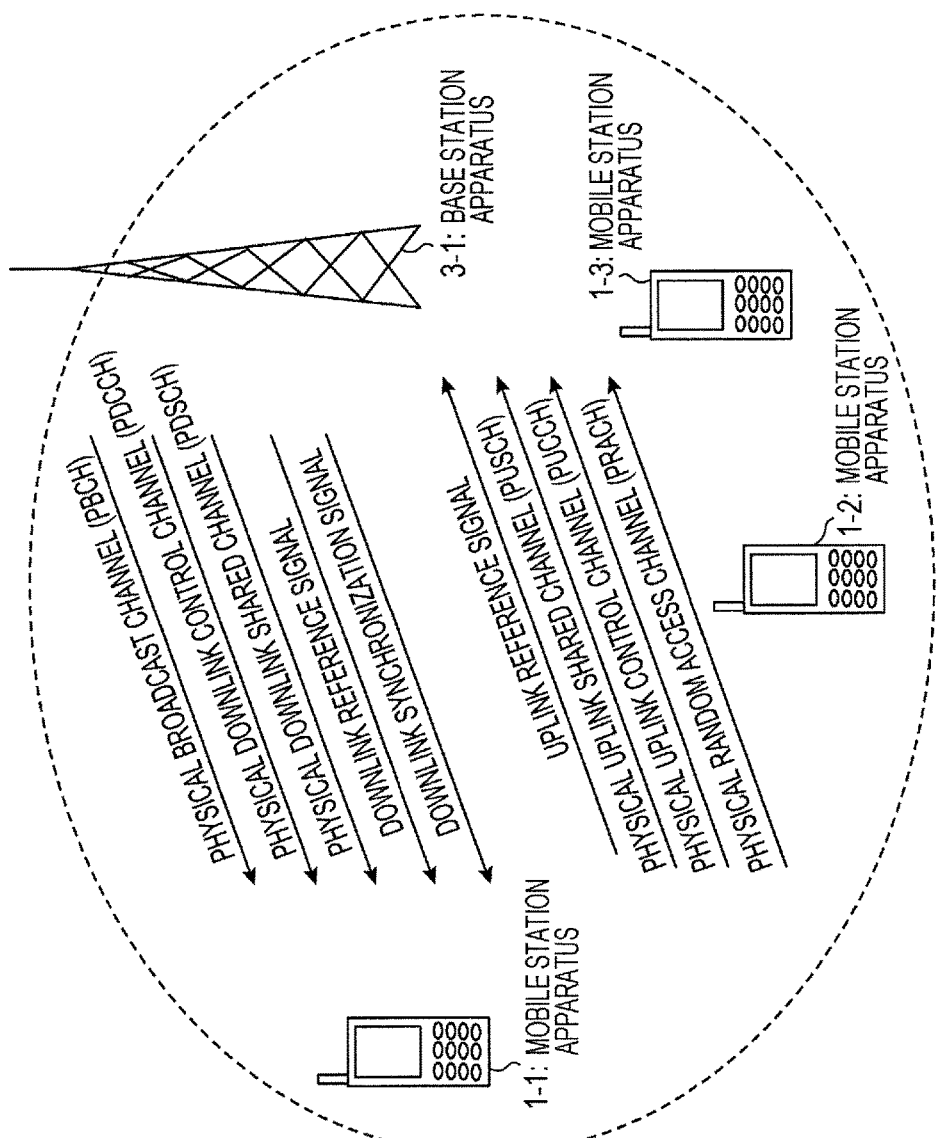
FIG. 6 is a diagram illustrating one example of a constitution of a Physical Channel in EUTRA.

FIG. 6 is a diagram illustrating a constitution of a Physical Channel for EUTRA. A downlink physical channel is constituted from a Physical Downlink Shared Channel (PDSCH), a Physical Downlink Control Channel (PDCCH), and a Physical Broadcast Channel (PBCH). In addition to these, there is a physical signal that is a downlink reference signal (NPL 1).

An uplink physical channel is constituted from a Physical Random Access Channel (PRACH), Physical Uplink Shared Channel (PUSCH), and a Physical Uplink Control Channel (PUCCH). In addition to these, there is a physical signal that is an uplink reference signal (NPL 1).

Figure 7:
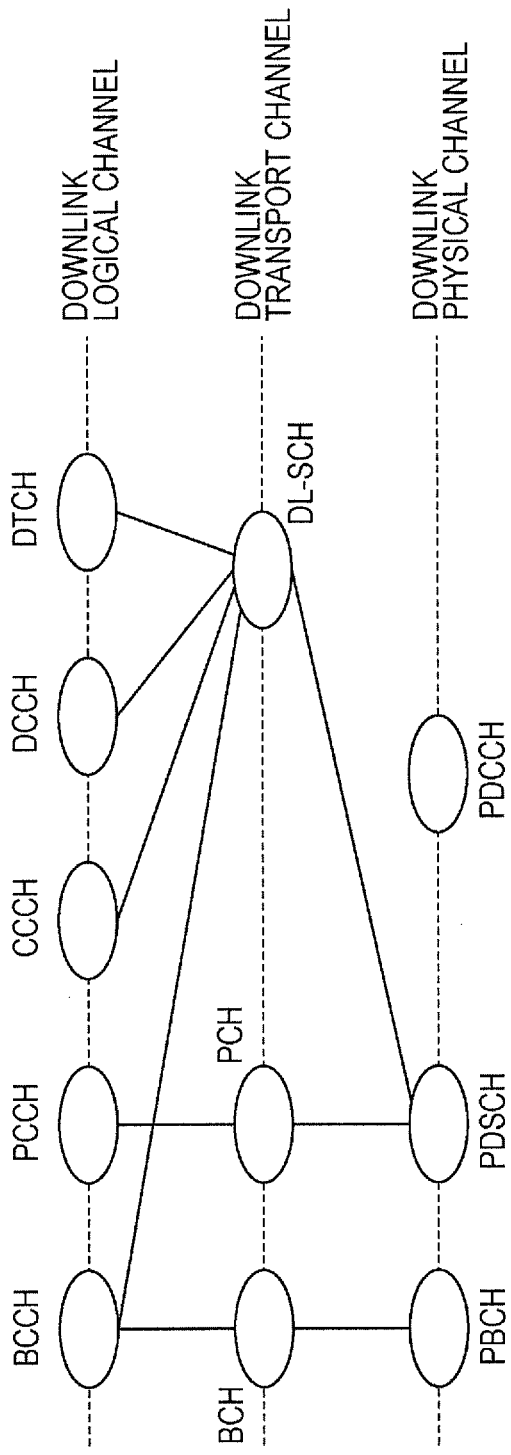
FIG. 7 is a diagram illustrating one example of a constitution of a downlink channel in EUTRA.

FIG. 7 is a diagram illustrating a constitution of a downlink channel for EUTRA. Each downlink channel that is illustrated in FIG. 7 is constituted from a logical channel, a transport channel, and a physical channel. The logical channel defines a type of data transmission service that is transmitted and received with a Medium Access Control (MAC) layer. The transport channel defines what attribute data that is transmitted with a wireless interface has and how the data is transmitted. The physical channel is a physical channel on which to transport data which is transferred on the transport channel to a Physical Layer.

Downlink logical channels include a Broadcast Control Channel (BCCH), a Paging Control Channel (PCCH), a Common Control Channel (CCCH), a Dedicated Control Channel (DCCH), and a Dedicated Traffic Channel (DTCH).

Downlink transport channels include a Broadcast Channel (BCH), a Paging Channel (PCH), and a Downlink Shared Channel (DL-SCH).

Downlink physical channels includes a Physical Broadcast Channel (PBCH), a Physical Downlink Control Channel (PDCCH), and a Physical Downlink Shared Channel (PDSCH). These channels are transmitted and received between a base station apparatus and a mobile station apparatus.

Next, the logical channel is described. The broadcast control channel (BCCH) is a downlink channel that is used for broadcasting system control information. The paging control channel (PCCH) is a downlink channel that is used for transmitting paging information, and is used when a network does not know a cell location of the mobile station apparatus. The Common Control Channel (CCCH) is a channel that is used for transmitting control information between the mobile station apparatus and the network, and is used by the mobile station apparatus that does not have a Radio Resource Control (RRC) connection to the network.

The Dedicated Common Control Channel (DCCH) is a point-to-point bidirectional channel, and is a channel that is used for transmitting individual control information between the mobile station apparatus and the network. The Dedicated Common control channel (DCCH) is used by the mobile station apparatus that has the RRC connection. The Dedicated Traffic Channel (DTCH) is a point-to-point bidirectional channel, is a channel dedicated for one mobile station apparatus, and is used for transfer of user information (unicast data).

Next, the transport channel is described. The Broadcast Channel (BCH) is broadcast to all cells in a transmission format that is fixed and is in advance defined. On the Downlink Shared Channel (DL-SCH), a Hybrid Automatic Repeat Request (HARQ), dynamic adaptive radio link control, Discontinuous Reception (DRX) are supported, and the Downlink Shared Channel needs to be broadcast to all cells.

On the Paging Channel (PCH), the DRX is supported, and the Paging Channel needs to be broadcast to all cells. Furthermore, the Paging Channel (PCH) is mapped to a physical resource that is used dynamically for the transport channel or other control channels, that is, to the Physical Downlink Shared Channel (PDSCH).

Next, the physical channel is described. The Physical Broadcast Channel (PBCH) maps the Broadcast Channel (BCH) with a periodicity of 40 milliseconds. The Physical Downlink Control Channel (PDCCH) is a channel that is used for notifying the mobile station apparatus of resource allocation of the Downlink Shared Channel (PDSCH), Hybrid Automatic Repeat Request (HARQ) information for downlink data, and an uplink transmission approval (uplink grant) that is resource allocation of the Physical Uplink Shared Channel (PUSCH). The Physical Downlink Shared Channel (PDSCH) is a channel that is used for transmitting the downlink data or the paging information.

Next, channel mapping is described. As illustrated in FIG. 7, in downlink, mapping between the transport channel and the physical channel is performed as follows. The Broadcast Channel (BCH) is mapped to the Physical Broadcast Channel (PBCH). The Paging Channel (PCH) and the Downlink Shared Channel (DL-SCH) are mapped to the Physical Downlink Shared Channel (PDSCH). The Physical Downlink Control Channel (PDCCH) is used in a stand-alone manner as a physical channel.

Figure 8:
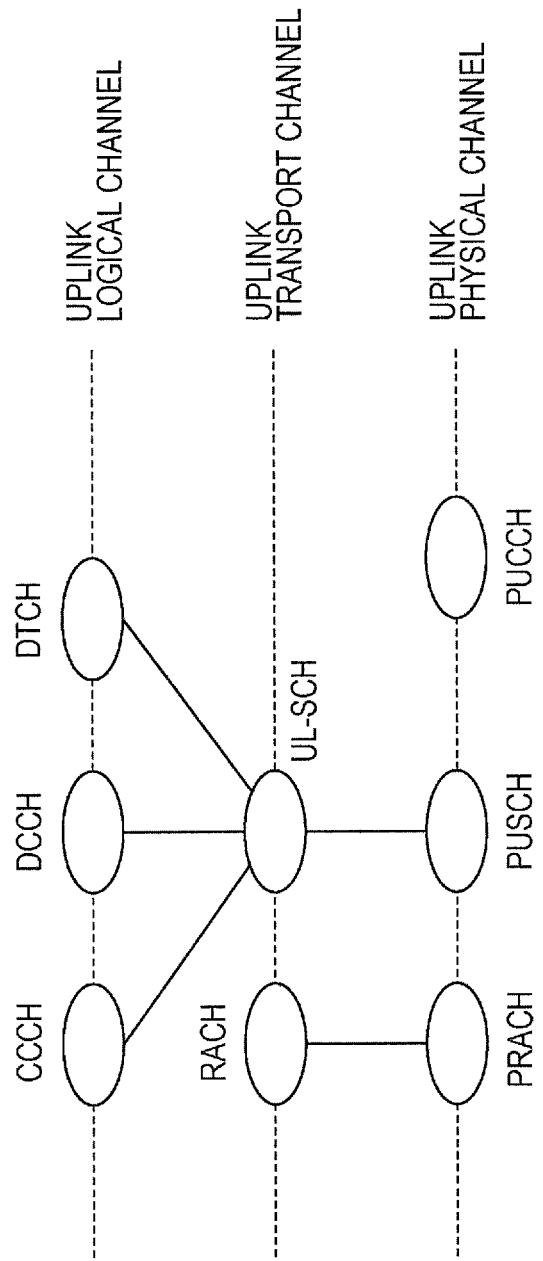
FIG. 8 is a diagram illustrating one example of a constitution of an uplink channel in EUTRA.

Furthermore, in the downlink, mapping between the logical channel and the transport channel is performed as follows. The Paging Control Channel (PCCH) is mapped to the Paging Channel (PCH). The Broadcast Control Channel (BCCH) is mapped the Broadcast Channel (BCH) and the Downlink Shared Channel (DL-SCH). The Common Control Channel (CCCH), the Dedicated Control Channel (DCCH), and the Dedicated Traffic Channel (DTCH) are mapped to the Downlink Shared Channel (DL-SCH), FIG. 8 is a diagram of a constitution of an uplink channel for EUTRA. Each uplink channel that is illustrated in FIG. 8 is constituted from a logical channel, a transport channel, and a physical channel. The definition by each channel is the same as in the downlink channel.

Uplink logical channels include a Common Control Channel (CCCH), a Dedicated Control Channel (DCCH), and a Dedicated Traffic Channel (DTCH).

Uplink transport channels include Uplink Shared Channel (UL-SCH) and a Random Access Channel (RACH).

Uplink physical channels include a Physical Uplink Control Channel (PUCCH), a Physical Uplink Shared Channel (PUSCH), and a Physical Random Access Channel (PRACH). These channels are transmitted and received between the base station apparatus and the mobile station apparatus. Moreover, the Physical Random Access Channel (PRACH) is used for transmitting a random access preamble for acquiring transmission timing information from the base station apparatus to the base station apparatus. The transmission of the random access preamble transmission is performed while a random access procedure is being executed.

Next, the logical channel is described. The Common Control Channel (CCCH) is a channel that is used for transmitting the control information between the mobile station apparatus and the network, and is used by the mobile station apparatus that does not establish the Radio Resource Control (RRC) connection to the network.

The Dedicated Common Control Channel (DCCH) is a point-to-point bidirectional channel, and is a channel that is used for transmitting the individual control information between the mobile station apparatus and the network. The Dedicated Common control channel (DCCH) is used by the mobile station apparatus that has the RRC connection. The Dedicated Traffic Channel (DTCH) is a point-to-point bidirectional channel, is a channel dedicated for one mobile station apparatus, and is used for the transfer of the user information (the unicast data).

Next, the transport channel is described. On the Uplink Shared Channel (UL-SCH), a Hybrid Automatic Repeat Request (HARQ), dynamic adaptive radio link control, Discontinuous transmission (DTX) are supported. On the Random Access Channel (RACH), limited control information is transmitted.

Next, the physical channel is described. The Physical Uplink Control Channel (PUCCH) is a channel that is used for notifying the base station apparatus of response information (ACK/NACK) in response to the downlink data, downlink wireless channel quality information, and transmission request (Scheduling Request (SR)) for uplink data. The Physical Uplink Shared Channel (PUSCH) is a channel that is used for transmitting the uplink data. The Physical Random Access Channel is a channel that is used for transmitting the random access preamble.

Next, the channel mapping is described. In uplink, the mapping between the transport channel and the physical channel as illustrated in FIG. 8 is performed. The Uplink Shared Channel (UL-SCH) is mapped to the Physical Uplink Shared Channel (PUSCH). The Random Access Channel (RACH) is mapped to the Physical Random Access Channel (PRACH). The Physical Uplink Control Channel (PUCCH) is a physical channel for which there is no transport channel to be mapped.

Furthermore, in the uplink, the mapping between the logical channel and the transport channel is performed as follows. The Common Control Channel (CCCH), the Dedicated Control Channel (DCCH), and the Dedicated Traffic Channel (DTCH) are mapped to the Uplink Shared Channel (UL-SCH).

Figure 9:
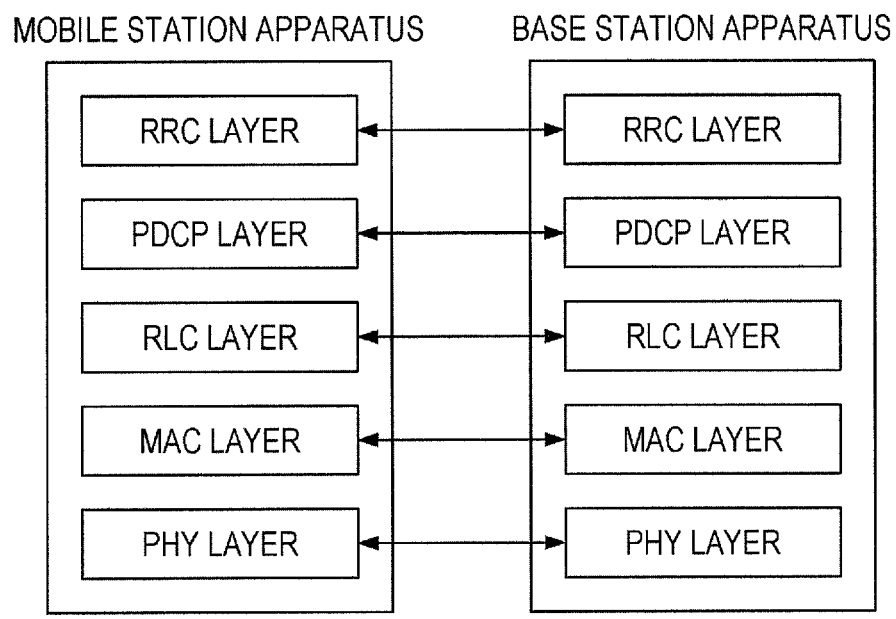
FIG. 9 is a diagram illustrating one example of a constitution of a communication protocol relating to control information on the base station apparatus and the mobile station apparatus.
Figure 10:
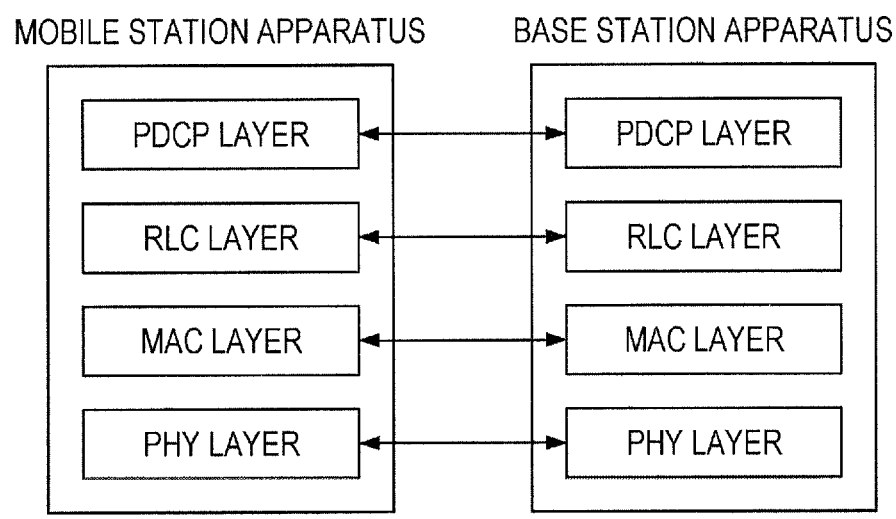
FIG. 10 is a diagram illustrating one example of a constitution of a communication protocol relating to user information of the base station apparatus and the mobile station apparatus.

FIG. 9 is a protocol stack that handles control data of each of the mobile station apparatus and the base station apparatus for EUTRA. FIG. 10 is a protocol stack that handles user data of each of the mobile station apparatus and the base station apparatus for EUTRA. A description is provided below referring to FIGS. 9 and 10.

The Physical Layer (PHY layer) provides a transfer size to a higher layer using the Physical Channel. The PHY layer is connected to a higher-level Medium Access Control layer (MAC layer) with the transport channel. Through the transport channel, data moves between layers, the MAC layer and the PHY layer. Between the PHY layers of the terminal device and the base station apparatus, data transmission and reception are performed through the Physical Channel.

The MAC layer performs mapping of various Logical Channels on various transport channels. The MAC layer is connected to a higher-level Radio Link Control layer (RLC layer) with the logical channel. The logical channel is broadly divided by a type of information that is transferred, and is divided into a control channel on which the control information is transferred and a traffic channel on which the user information is transferred. In order to perform the discontinuous reception and transmission (DRX/DTX), the MAC layer has a function of performing control of the PHY layer, a function of executing the random access procedure, a function of notifying transmit power information (a power headroom report), a function of performing HARQ control, and the like.

The RLC layer performs segmentation and concatenation of data that is received from the higher layer, and adjusts a data size in such a manner that a lower layer can suitably perform data transmission. The RLC layer performs the concatenation of the data that is received from the lower layer, and transfers the resulting data to the higher layer. Furthermore, the RLC layer has a function (data retransmission control) for guaranteeing Quality of Service (QoS) that is requested by each piece of data.

Sizes of the RLC layer are three modes, that is, a Transparent Mode (TM), an Unacknowledged Mode (UM), and an Acknowledged Mode (AM). The Transparent Mode (TM) is a size for transferring without any change the data that is received from the higher layer. The Unacknowledged Mode (UM) is a size for attaching a sequence number in the RLC layer on the transmission side RLC layer, checking for order in the RLC layer on the reception side, destroying redundant data, and so forth. The Acknowledged Mode (AM) is a size for providing retransmission control.

In order to efficiently transfer in a wireless section an IP packet that is the user data, a Packet Data Convergence Protocol layer (PDCP layer) has a header compression function of performing compression of the control information. Furthermore, the PDCP layer has a data encryption function as well.

A Radio Resource Control layer (RRC layer) defines only the control information. The RRC layer performs configuration or reconfiguration of a radio bearer (RB), and performs control of the logical channel, the transport channel, and the Physical Channel. The RB is divided into a signaling radio bearer (SRB) and a data radio bearer (DRB). The SRB is used as a path along which an RRC message that is the control information is transmitted. The DRB is used as a path along which the user data is transmitted. Configuration of each RB is performed between the RRC layers of the base station apparatus and the mobile station apparatus.

Moreover, the PHY layer corresponds to the Physical Layer that is the first layer in a hierarchical structure of the Open Systems Interconnection (OSI) model that is generally known, the MAC layer, and the RLC layer and the PDCP layer correspond to a data link layer that is the second layer of the OSI model, and the RRC layer corresponds to a network layer that is the third layer of the OSI model.

The random access procedure will be described below. The random access procedures include two random access procedures (NPL 1). One is a Contention based Random Access Procedure and the other is a Non-contention based Random Access procedure.

The Contention based Random Access procedure is a random access procedure in which there is a likelihood that contention will take place between mobile station apparatuses, and is performed at the Scheduling Request, such as during the time from a state where a connection (communication with) to the base station apparatus is not made to when initial access takes place, or in a case where the connection to the base station apparatus is made but uplink data transmission takes place to the mobile station apparatus in a state where uplink synchronization is no longer maintained.

The Non-contention based Random Access procedure is a random access procedure in which the contention does not take place between the mobile station apparatuses. In order to quickly achieve the uplink synchronization between the mobile station apparatus and the base station apparatus in a case where a connection is made between the base station apparatus and the mobile station apparatus but the uplink synchronization is no longer maintained, in a special case such as a case where a handover or a transmission timing for the mobile station apparatus is not enabled, the mobile station apparatus starts the random access procedure when is instructed by the base station apparatus to do so. An instruction to execute the Non-contention based Random Access procedure is provided using a Radio Resource Control (RRC) (Layer 3) layer message and control data on the Physical Downlink Control Channel (PDCCH).

The contention based Random Access procedure is briefly described. First, the mobile station apparatus 1-1 selects the random access preamble using random access procedure configuration information, and transmits the random access preamble to a base station apparatus 3-1 (message 1: (1) Step S1). Then, the base station apparatus 3-1 that receives the random access preamble transmits a response (a random access response) to the random access preamble to a mobile station apparatus 1-1 (message 2: (2) in Step S2). The mobile station apparatus 1-1 transmits a higher layer (Layer 2/Layer 3) message, based on scheduling information that is included in the random access response (message 3: (3) in Step S3). The base station apparatus 3-1 transmits a contention resolution message to the mobile station apparatus 1-1 that receives the higher layer message of (3) (message 4: (4) in Step S4). Moreover, the Contention based Random Access is also referred to as random preamble transmission.

The Non-contention based Random Access procedure is briefly described. First, the base station apparatus 3-1 notifies the mobile station apparatus 1-1 of a preamble number (or a sequence number) and a random access channel number to be used (message 0: (1)' in Step S11). The mobile station apparatus 1-1 transmits the random access preamble of the designated preamble number to a designated Random Access Channel (RACH) (message 1: (2)' in Step S12). Then, the base station apparatus 3-1 that receives the random access preamble transmits the response (the random access response) to the random access preamble to the mobile station apparatus 1-1 (message 2: (3)' in Step S13). However, in a case where a value of the notified preamble number is 0, the Contention based Random Access procedure is executed. Moreover, the Non-contention based Random Access procedure is also referred to as dedicated preamble transmission.

Moreover, the mobile station apparatus 1-1 acquires the random access procedure configuration information from the base station apparatus 3-1. Furthermore, the mobile station apparatus 1-1 acquires physical random access configuration information from the base station apparatus 3-1. Pieces of random access procedure configuration information include information on the number of random preambles, information relating to random access response reception, information relating to random access preamble transmission, information relating message 3 transmission, and information relating to contention resolution message reception, and the like. Furthermore, pieces of physical random access channel configuration information include information on allocation of the Physical Random Access Channel, information on generation of the random access preamble, and the like.

The Scheduling Request (SR) will be described below. The Physical Uplink Control Channel (PUCCH) is used for transmission of a response (an ACK/NACK of) to the downlink data that is transmitted on the Physical Downlink Shared Channel (PUSCH), wireless channel quality information (a Channel Quality Indicator (CQI)) in the downlink, and the transmission request (Scheduling Request (SR)) for the uplink data. In a case where the mobile station apparatus 1-1 makes the transmission request for the uplink data, the mobile station apparatus 1-1 transmits the Scheduling Request to the base station apparatus 3-1 using the Physical Uplink Control Channel (PUCCH) that is allocated by the base station apparatus 3-1.

After the transmission of the Scheduling Request, in a case where the base station apparatus 3-1 allocates the Physical Uplink Shared Channel (PUSCH), the mobile station apparatus 1-1 transmits a Buffer Status Report (BSR) indicating a buffer status information of data that is transmitted, on the allocated Physical Uplink Shared Channel (PUSCH), by the mobile station apparatus 1-1. Moreover, the base station apparatus 3-1 performs uplink data scheduling on the mobile station apparatus 1-1 based on the Buffer Status Report.

After the transmission of the Scheduling Request, in a case where the base station apparatus 3-1 does not allocate the Physical Uplink Shared Channel (PUSCH), the mobile station apparatus 1-1 again transmits the Scheduling Request. Although the retransmission of the Scheduling Request is iterated, in the case where the base station apparatus 3-1 does not allocate the Physical Uplink Shared Channel (PUSCH), the mobile station apparatus 1-1 releases the Physical Uplink Control Channel (PUCCH) that is allocated and the uplink reference signal, and executes the random access procedure that is intended for the Scheduling Request. Moreover, in the Scheduling Request using the random access procedure, with transmission of message 3, the mobile station apparatus 1-1 transmits the Buffer Status Report.

When it comes to a function of the MAC layer of the mobile station apparatus, the MAC layer that will be described in more detail below has a function of mapping each logical channel to the transport channel. The procedure described above is also referred to as a Logical Channel Prioritization (LCP). In a basic LCP procedure, transmission priority of the transmission data is determined considering a priority level of each logical channel and a transmission bit rate (Prioritized Bit Rate (PBR)) that has to be transmitted within a fixed period, which corresponds to QoS of the radio bearer, and mapping to the transport channel is performed starting from data with the highest priority at the point of time when the uplink grant is received. When making a connection to the base station apparatus, the MAC layer acquires pieces of information, such as a logical channel number of each RB, the priority level of the Logical Channel, and the PBR, from the RRC layer.

Furthermore, the MAC layer has a function of notifying an amount of data in a transmission buffer that corresponds to each logical channel. This function is referred to as the Buffer Status Report (BSR). With the BSR, each logical channel is allocated to a Logical Channel Group (LCG), and an amount of transmission buffer for each LCG is notified, as a message of the MAC layer, to the base station apparatus.

As conditions for triggering the BSR, there are several conditions. For example, in a case where data available for transmission occurs and where the data has a higher priority level than data that is present in the transmission buffer, the condition for triggering the BSR is satisfied. Furthermore, in a case where one periodic timer expires, the condition for triggering the BSR is satisfied. Moreover, BSRs include a Short BSR in which a buffer status of one Logical Channel Group is reported, and a Long BSR in which a buffer status of multiple Logical Channel Groups is reported.

Moreover, in a case where the condition for triggering the BSR is satisfied, if a radio resource (the Physical Uplink Shared Channel (PUSCH)) for notifying the BSR is not allocated, the MAC layer instructs the PHY layer to transmit the Scheduling Request (SR). Because the radio resource is allocated, the MAC layer transmits the BSR. In a case where the PHY layer is instructed by the MAC layer to transmit the Scheduling Request, the PHY layer transmits the Scheduling Request using the Physical Uplink Control Channel (PUCCH). Moreover, in a case where the Physical Uplink Control Channel (PUCCH) for the transmission of the Scheduling Request is not allocated (is not enabled), the MAC layer instructs the PHY layer to make the Scheduling Request that uses the Physical Random Access Channel (PRACH).

Furthermore, the MAC layer has a function of notifying the transmit power information of the mobile station apparatus 1-1. This function is referred to as a Power Headroom Report (PHR). As conditions for triggering the PHR, there are several conditions. For example, in a case where downlink wireless channel quality is compared with the channel quality that is previously measured, and where a change of a fixed value or more takes place, the condition for triggering the PHR is satisfied. Furthermore, in a case where one periodic timer expires, the condition for triggering the PHR is satisfied.

In 3GPP, a study of Advanced-EUTRA that is a further advanced version of EUTRA has been conducted as well. It is assumed that in Advanced-EUTRA, a band up to a maximum bandwidth of 100 MHz is used in each of the uplink and the downlink, and that transmission is performed to the maximum at a transfer rate of 1 Gbps or more in the downlink and at a transfer rate of 500 Mbps or more in the uplink.

It is considered that in Advanced-EUTRA, multiple bands of 20 MHz or less for EUTRA are aggregated in such a manner that the mobile station apparatus for EUTRA can be accommodated as well, and thus a band of 100 MHz is realized at the maximum. Moreover, in Advanced-EUTRA, one band of 20 MHz or less for EUTRA is referred to as a Component Carrier (CC). Furthermore, a combination of one downlink component carrier and one uplink component carrier constitutes one cell. Moreover, only one downlink component carrier can constitute one cell as well.

The base station apparatus that is allocated multiple cells in accordance with communication capability of and a communication condition in the mobile station apparatus is set in such a manner as to perform communication with the mobile station apparatus through the allocated multiple cells. Moreover, the multiple cells that are allocated to the mobile station apparatus are categorized into one cell, that is, a Primary Cell (PCell) and cells other than the one cell, that is, Secondary Cells (SCells). A special function, such as the allocation of the Physical Uplink Control Channel (PUCCH), is configured for the Primary Cell.

Furthermore, in order to decrease power consumption by the mobile station apparatus, the mobile station apparatus is instructed by the base station apparatus to activate (or to perform activation on) the Secondary Cell immediately after the allocation without performing downlink reception processing (or without complying with radio resource allocation information that is indicated with the Physical Downlink Control Channel (PDCCH)), and then is set in such a manner as to start the downlink reception processing on the Secondary Cell that the mobile station apparatus is instructed to activate (or to comply with the radio resource allocation information that is indicated with the Physical Downlink Control Channel (PDCCH)).

Furthermore, the mobile station apparatus is instructed by the base station apparatus to deactivate (or to perform deactivation on) the Secondary Cell that is activated and then is set in such a manner as to stop the downlink reception processing on the Secondary Cell that the mobile station apparatus is instructed to deactivate (or not to comply with the radio resource allocation information that is indicated with the Physical Downlink Control Channel (PDCCH)). Moreover, the Secondary Cell that is activated according to the instruction from the base station apparatus and on which the downlink reception processing is performed is referred to as an activated cell, and the Secondary Cell immediately after being allocated by the base station apparatus to the mobile station apparatus and the Secondary Cell that is deactivated according to the base station apparatus and the downlink reception processing on which is stopped are referred to as deactivated cells. Furthermore, the Primary Cell is at all times an activated cell.

Moreover, in a case of performing the Carrier Aggregation, the MAC layer of the mobile station apparatus has a function of performing the control of the PHY layer to activate or deactivate a cell and a function of performing the control of the PHY layer to manage an uplink transmission timing.

Figure 11:
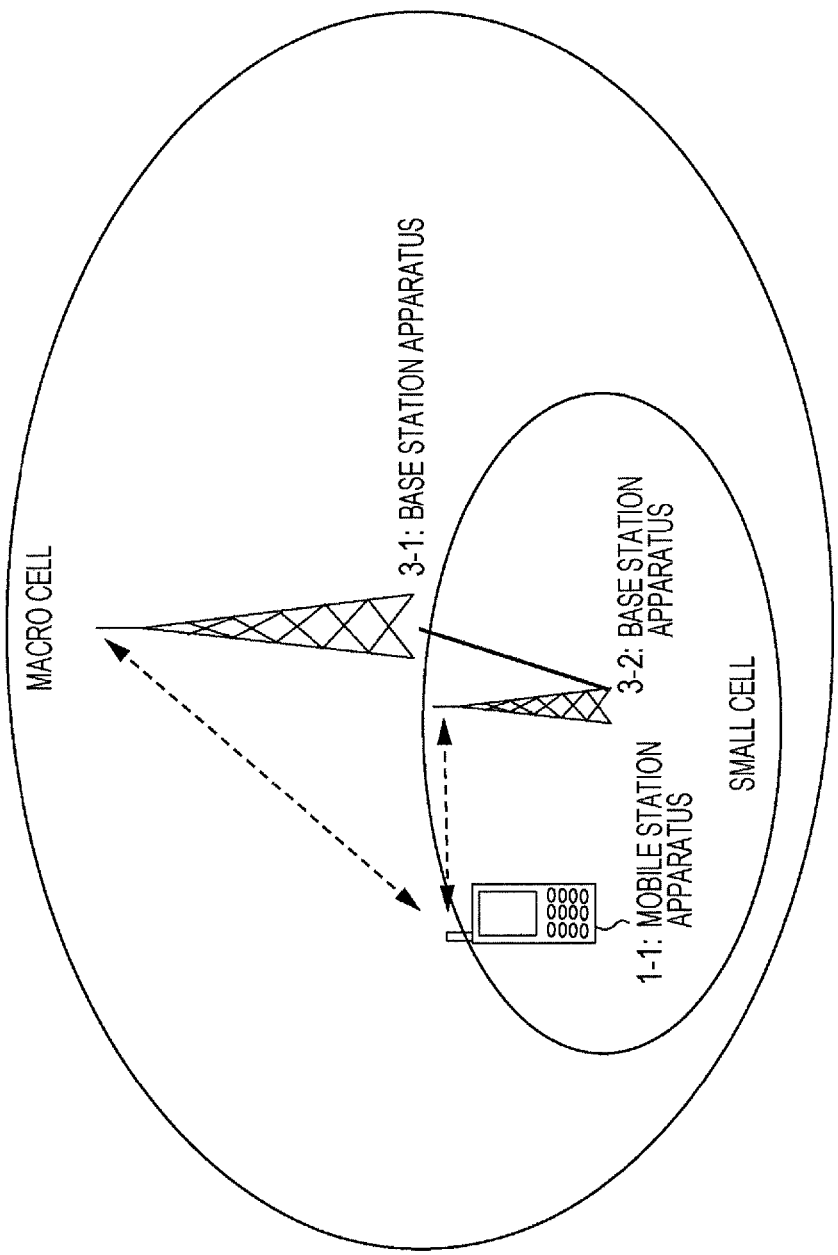
FIG. 11 is a diagram for describing one example of Dual Connect.

Furthermore, it is also considered that the mobile station apparatus, as illustrated in FIG. 11, performs Dual Connect to two base station apparatuses, and thus makes connections to both of the two base station apparatuses at the same time. In the Dual Connect, it is assumed that, when a connection between the base station apparatus in a Macro Cell and the base station apparatus in a Small Cell is made using a low-speed backbone line (which is also referred to as backhaul) that causes a delay, not a high-speed backbone that is regarded as causing no delay, such as optical fiber, the mobile station apparatus makes connections to the base station apparatus in the Macro Cell and the base station apparatus in the Small Cell, and thus the mobile station apparatus and both of the base station apparatuses perform the data transmission and reception through the multiple cells (NPL 2).

As in the Carrier Aggregation, in the Dual Connect, it is desirable that the communication is performed between the mobile station apparatus and the base station apparatus with the Macro Cell as the Primary Cell (PCell) and the Small Cell as the Secondary Cell (SCell), and the Dual Connect may be configured in such a manner that the Dual Connect has no relationship with a type of cell (the Macro Cell or the Small Cell) of the base station apparatus. Furthermore, in the Dual Connect, it is assumed that the transmission and reception of the control data (the control information) is performed between the base station apparatus in the Macro Cell and the mobile station apparatus, and that the transmission and reception of the user data (the user information) is performed between the base station apparatus in the Small Cell and the mobile station apparatus.

Additionally, it is also considered that in addition to categorizations, that is, the control data and the user data, based on a type of data (for example, the QoS or the logical channel), the base station apparatus that performs the data transmission and reception is changed. For example, it is considered that data on the same data radio bearer is transmitted from the base station apparatus that is different from the base station apparatus in the Macro Cell and the base station apparatus in the Small Cell to the mobile station apparatus, and that the data on the same data radio bearer is transmitted from the mobile station apparatus to the base station apparatus in the Macro Cell and the base station apparatus in the Small Cell.

Figure 12:
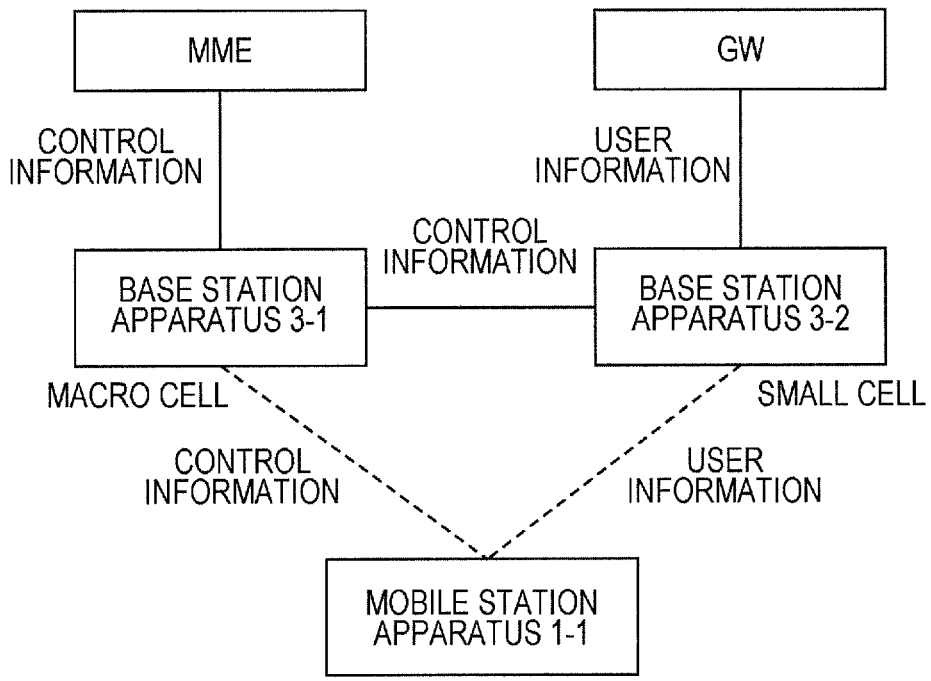
FIG. 12 is a diagram for describing one example of the Dual Connect.

In the Dual Connect as illustrated in FIG. 12, at least transmission and reception of the control information (control-plane information) of the mobile station apparatus 1-1 is performed between the base station apparatus 3-1 and a Mobility Management Entity (MME). At least transmission and reception of the user information (user-plane information) of the mobile station apparatus 1-1 is performed between a base station apparatus 3-2 in the Small Cell and a gateway (GW). Transmission and reception of the control information for controlling the mobile station apparatus 1-1 is performed between the base station apparatus 3-1 in the Macro Cell and the base station apparatus 3-2 in the Small Cell.

At least the transmission and reception of the control information are performed between the base station apparatus 3-1 in the Macro Cell and the mobile station apparatus 1-1. The transmission and reception of the user information are performed between the base station apparatus 3-2 in the Small Cell and the mobile station apparatus 1-1. Moreover, the transmission and reception of the user information is performed between the base station apparatus 3-1 in the Macro Cell and the mobile station apparatus 1-1.

Figure 13:
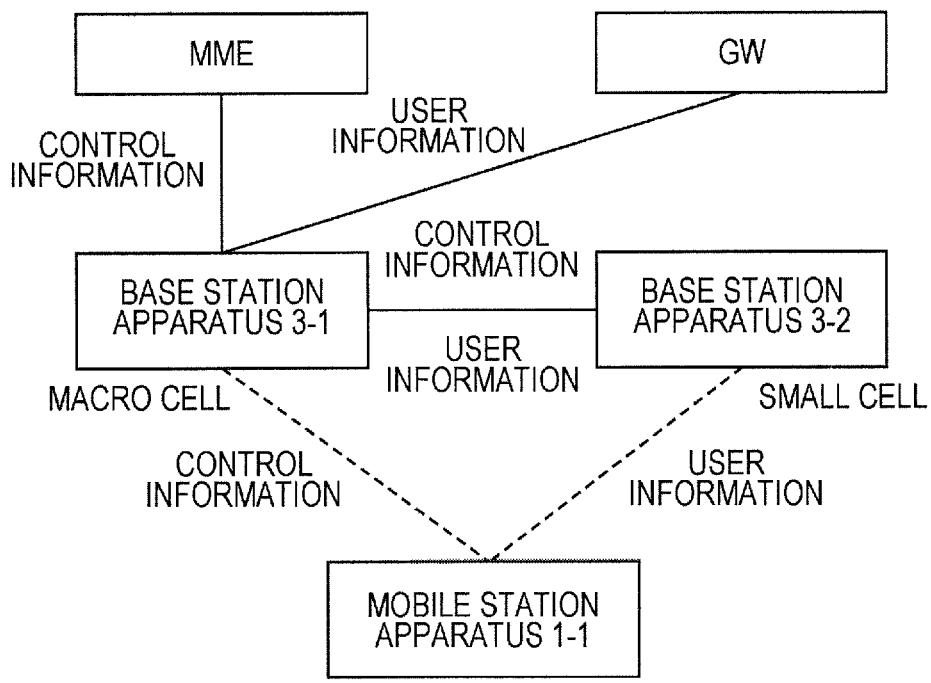
FIG. 13 is a diagram for describing one example of the Dual Connect.

Furthermore, in the Dual Connect as illustrated in FIG. 13, at least the transmission and reception of the control information (control-plane information) of the mobile station apparatus 1-1 is performed between the base station apparatus 3-1 and the Mobility Management Entity (MME). At least the transmission and reception of the user information (user-plane information) of the mobile station apparatus 1-1 are performed between the base station apparatus 3-1 in the Small Cell and the gateway (GW).

The base station apparatus 3-1 in the Macro Cell transfers to the user information that is received from the GW, to the base station apparatus 3-2 in the Small Cell. Furthermore, the base station apparatus 3-2 in the Small Cell transfers the user information that is received from the mobile station apparatus 1-1, to the base station apparatus 3-1. Furthermore, the transmission and reception of the control information for controlling the mobile station apparatus 1-1 is performed between the base station apparatus 3-1 in the Macro Cell and the base station apparatus 3-2 in the Small Cell.

The transmission and reception of the control information or the user information are performed between the base station apparatus 3-1 in the Macro Cell and the mobile station apparatus 1-1. The transmission and reception of the user information are performed between the base station apparatus 3-2 in the Small Cell and the mobile station apparatus 1-1. Moreover, in the case of a constitution in FIG. 13, Bearer Split is performed in which the mobile station apparatus and both of the base station apparatuses transmits and receives information on the same radio bearer (RB) through both cells, that is, the Macro Cell and the Small Cell.

Moreover, a cell group that includes the Macro Cell which is provided by the base station apparatus 3-1 is referred to as a master cell group (MCG), and a cell group that is constituted from one or more Small Cells which are provided by the base station apparatus 3-2 is referred to as a secondary cell group (SCG).

Moreover, in a case where one or both of a timing for reception in the mobile station apparatus for every downlink component carrier, which results from an arrangement relationship between the base station apparatuses and a timing for transmission to the base station apparatus for every uplink component carrier differ from one cell to another, cells that are the same in terms of uplink transmission timing are grouped and the communication is performed. A group of cells that are the same in terms of transmission timing is referred to as a transmission timing group (Timing Advance Group). The MAC layer of the mobile station apparatus has a function of controlling the PHY layer as well in order to manage the transmission timing group.

Embodiments

[Constitution Description]

Figure 1:
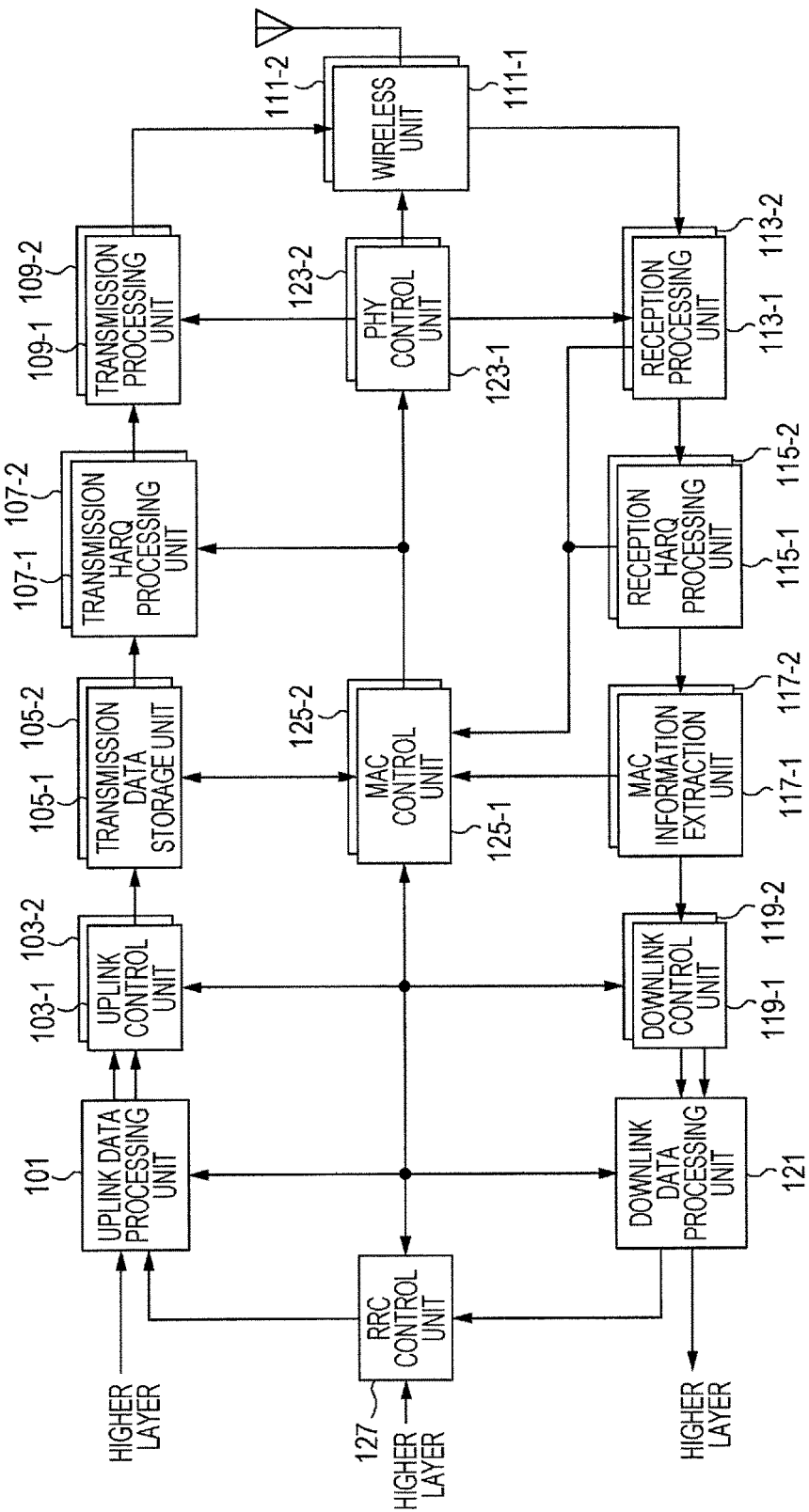
FIG. 1 is a diagram illustrating one example of a constitution of a mobile station apparatus according to an embodiment of the present invention.

FIG. 1 is a diagram illustrating a constitution of a mobile station apparatus according to an embodiment of the present invention. Mobile station apparatuses 1-1 to 1-3 each are constituted from an uplink data processing unit 101, an uplink control unit 103-1, an uplink control unit 103-2, a transmission data storage unit 105-1, a transmission data storage unit 105-2, a transmission HARQ processing unit 107-1, a transmission HARQ processing unit 107-2, a transmission processing unit 109-1, a transmission processing unit 109-2, a radio unit 111-1, a radio unit 111-2, a reception processing unit 113-1, a reception processing unit 113-2, a reception HARQ processing unit 115-1, a reception HARQ processing unit 115-2, a MAC information extraction unit 117-1, a MAC information extraction unit 117-2, a downlink control unit 119-1, a downlink control unit 119-2, a downlink data processing unit 121-1, a downlink data processing unit 121-2, a PHY control unit 123-1, a PHY control unit 123-2, a MAC control unit 125-1, a MAC control unit 125-2, and a RRC control unit 127.

Moreover, the uplink control unit 103-1, the transmission data storage unit 105-1, the transmission HARQ processing unit 107-1, the transmission processing unit 109-1, the radio unit 111-1, the PHY control unit 123-1, and the MAC control unit 125-1 perform an transmission operation on the base station apparatus 3-1 (the Macro Cell), and the uplink control unit 103-2, the transmission data storage unit 105-2, the transmission HARQ processing unit 107-2, the transmission processing unit 109-2, the radio unit 111-2, the PHY control unit 123-2, and the MAC control unit 125-2 performs a transmission operation on the base station apparatus 3-2 (the Small Cell).

The downlink control unit 119-1, the MAC information extraction unit 117-1, the reception HARQ processing unit 115-1, the reception processing unit 113-1, the radio unit 111-1, the PHY control unit 123-1, and the MAC control unit 125-1 perform the reception operation on the base station apparatus 3-1, and the downlink control unit 119-2, the MAC information extraction unit 117-2, the reception HARQ processing unit 115-2, the reception processing unit 113-2, the radio unit 111-2, the PHY control unit 123-2, and the MAC control unit 125-2 perform the reception operation of the base station apparatus 3-2.

The user data from the higher layer and the RRC control unit 127 from the user data are input into the uplink data processing unit 101. The uplink data processing unit 101 has a function of the PDCP layer. The uplink data processing unit 101 performs processing operations, such as head compression of or data encryption of an IP packet of the user data, data segmentation and concatenation, and adjusts a data size. The uplink data processing unit 101 outputs data on which the processing is performed, to the uplink control unit 103-1 or the uplink control unit 103-2. In a case where the uplink data processing unit 101 is instructed by the RRC control unit 127 to destroy data, the uplink data processing unit 101 destroys data that is being processed.

Moreover, according to an instruction from the base station apparatus 3-1, the uplink data processing unit 101 may be set to output data to the uplink control unit 103-1 or the uplink control unit 103-2. Furthermore, the uplink data processing unit 101 may be set to output the data to the uplink control unit 103-1 or the uplink control unit 103-2, taking into consideration an amount of data that is accumulated in the transmission data storage unit 105-1 and the transmission data storage unit 105-2, a quality state of a wireless channel, and the like.

The uplink control unit 103-1 has a function of the RLC layer. The uplink control unit 103-1 performs processing, such as the data segmentation and concatenation, on the data that is input from the uplink data processing unit 101, and adjusts the data size. Furthermore, the uplink control unit 103-1 performs retransmission on specific data. The uplink control unit 103-1 outputs the data on which the processing is performed, to the transmission data storage unit 105-1.

The uplink control unit 103-1 counts the number of times that the data on which retransmission control is performed is retransmitted. In a case where the number of times of retransmission reaches the maximum number of times of RLC transmission that is acquired from the RRC control unit 127, the uplink control unit 103-1 notifies the RRC control unit 127 of an RLC failure.

In a case where the uplink control unit 103-1 is instructed by the RRC control unit 127 to reestablish the RLC, the uplink control unit 103-1 performs destroying of data on which the processing is not completed in the uplink control unit 103-1, stopping or resetting of a timer, and initialization or resetting of various parameters. Moreover, the uplink control unit 103-2 performs the same processing than the uplink control unit 103-1, and outputs processed data to the transmission data storage unit 105-2.

The transmission data storage unit 105-1 accumulates (buffers) pieces of data on the logical channel, which are input from the uplink control unit 103-1, and outputs as much data as the transmission data storage unit 105-1 is instructed to output based on an instruction from the MAC control unit 125-1, to the transmission HARQ processing unit 107-1. Furthermore, the transmission data storage unit 105-1 outputs information on an amount of data that is accumulated based on the instruction from the MAC control unit 125-1, to the MAC control unit 125-1.

In a state where data on the logical channel is not present, in a case where data on a new logical channel is input from the uplink control unit 103-1, the transmission data storage unit 105-1 notifies the MAC control unit 125-1 that new data occurs. Furthermore, in a case where the data on the logical channel that has a higher priority level than the accumulated pieces of data on the logical channel is input from the uplink control unit 103-1, the transmission data storage unit 105-1 notifies the MAC control unit 125-1 that data which has a high priority level occurs. The transmission data storage unit 105-2 performs the same processing than the transmission data storage unit 105-1, and processes data that is input from the uplink control unit 103-2.

The transmission HARQ processing unit 107-1 performs coding on data that is input from the transmission data storage unit 105-1, and performs puncture processing on the coded data. Then, the transmission HARQ processing unit 107-1 outputs punctured data to the transmission processing unit 109-1, and retains the coded data. In a case where the transmission HARQ processing unit 107-1 is instructed by the MAC control unit 125-1 to retransmit data, the transmission HARQ processing unit 107-1 performs different puncture from the puncture that is previously performed, referring to the coded data that is retained, and outputs the punctured data to the transmission processing unit 109-1.

The transmission HARQ processing unit 107-2 performs the same processing than the transmission HARQ processing unit 107-1, processes the data that is input from the transmission data storage unit 105-2, and output the processed data to the transmission processing unit 109-2.

The transmission processing unit 109-1 performs modulation and coding on data that is input from the transmission HARQ processing unit 107-1. The transmission processing unit 109-1 performs Discrete Fourier Transform (DFT)-Inverse Fast Fourier Transform (IFFT) processing on the modulated and coded data, inserts cyclic prefix (CP) after the processing, maps post-CP insertion data to the Physical Uplink Shared Channel (PUSCH) in each component carrier (or cell) for the uplink, and outputs a result of the mapping to the radio unit 111-1.

Furthermore, in a case where the transmission processing unit 109-1 is instructed by the PHY control unit 123-1 to provide a response to reception data, the transmission processing unit 109-1 generates an ACK or NACK signal, maps the generated signal to the Physical Uplink Control Channel (PUCCH) in each component carrier for the uplink, and outputs the resulting signal to radio unit 111-1. In a case where the transmission processing unit 109-1 is instructed by the PHY control unit 123-1 to transmit the Scheduling Request, the transmission processing unit 109-1 generates a scheduling request signal, maps the generated signal to the Physical Uplink Control Channel (PUCCH) in each component carrier for the uplink, and outputs the resulting signal to the radio unit 111-1.

In a case where the transmission processing unit 109-1 is instructed by the PHY control unit 123-1 to transmit a random access preamble, the transmission processing unit 109-1 generates the random access preamble, maps the generated signal to the Physical Random Access Channel (PRACH), and outputs the resulting signal to the radio unit 111-1. The transmission processing unit 109-2 performs the same processing as the transmission processing unit 109-1, processes data that is input from the transmission HARQ processing unit 107-2, and outputs the processed data to the radio unit 111-2.

The radio unit 111-1 up-converts data that is input from the transmission processing unit 109-1, into a wireless frequency of transmission location information (transmission cell information) that is indicated by the PHY control unit 123-1, adjusts transmit power, and transmits the resulting data from a transmit antenna. Furthermore, the radio unit 111-1 down-converts a wireless signal that is received from a receive antenna, and outputs the resulting signal to the reception processing unit 113-1.

In the same manner, the radio unit 111-2 up-converts data that is input from the transmission processing unit 109-2, into a wireless frequency of transmission location information (transmission cell information) that is specified by the PHY control unit 123-2, adjusts transmit power, and transmits the resulting data from the transmit antenna. Furthermore, the radio unit 111-2 down-converts a wireless signal that is received from a receive antenna, and outputs the resulting signal to the reception processing unit 113-2. Moreover, frequencies that are controlled in the radio unit 111-1 and the radio unit 111-2 may be in the same frequency band, and may be in different frequency bands.

The reception processing unit 113-1 performs Fast Fourier Transform (FFT) processing, decoding, demodulation processing, and the like on data that is input from the radio unit 111-1. Among pieces of demodulated data, the reception processing unit 113-1 outputs data on the Physical Downlink Shared Channel (PDSCH) to the reception HARQ processing unit 115-1. Furthermore, among the pieces of modulated data, the reception processing unit 113-1 outputs response information (ACK/NACK) of uplink transmission data and uplink transmission approval information (uplink grant) in control data that is acquired from the Physical Downlink Control Channel (PDCCH), to the MAC control unit 125-1. The reception processing unit 113-1 measures a downlink reference signal, calculates wireless channel quality, and outputs a result of the calculation to the MAC control unit 125-1.

Moreover, pieces of uplink transmission approval information include transmission location information for a uplink radio resource (the Physical Uplink Shared Channel (PUSCH)), data modulation and coding schemes, data size information, HARQ information, and the like. Furthermore, the reception processing unit 113-1 measures the downlink reference signal, and measures the downlink wireless channel quality between the base station apparatus 3-1 and the mobile station apparatus 1-1. The reception processing unit 113-2 performs the same processing than the reception processing unit 113-1, processes data that is input from the radio unit 111-2, and outputs the processed data to the reception HARQ processing unit 115-2 outputs.

The reception HARQ processing unit 115-1 performs decoding processing of the data that is input from the reception processing unit 113-1, and in a case where the decoding processing succeeds, outputs the resulting data to the MAC information extraction unit 117-1. In a case where the decoding processing of the data that is input fails, the reception HARQ processing unit 115-1 retains the data of which the decoding processing fails. In a case where data that is retransmitted is received, the reception HARQ processing unit 115-1 composites the data that is retained and the data that is retransmitted, and performs the decoding processing on the resulting data.

Furthermore, the reception HARQ processing unit 115-1 notifies the MAC control unit 125-1 whether or not the decoding processing of the data that is input succeeds. The reception HARQ processing unit 115-2 performs the same processing as the reception HARQ processing unit 115-1, processes data that is input from the reception processing unit 113-2, and outputs the processed data to the MAC information extraction unit 117-2.

The MAC information extraction unit 117-1 extracts control data on the Medium Access Control Layer (MAC layer) from the data that is input from the reception HARQ processing unit 115-1, and outputs the extracted control information to the MAC control unit 125-1. The MAC information extraction unit 117-1 outputs the remaining data to the downlink control unit 119-1. The MAC information extraction unit 117-2 performs the same processing as the MAC information extraction unit 117-1, processes data that is input from the reception HARQ processing unit 115-2, and outputs the processed data to the downlink control unit 119-2.

The downlink control unit 119-1 has a function of the RLC layer, and performs processing that is input from MAC information extraction unit 117-1, such as the data segmentation and concatenation. The downlink control unit 119-1 outputs the processed data to the downlink data processing unit 121. The downlink control unit 119-2 performs the same processing as the downlink control unit 119-1, processes data that is input from the MAC information extraction unit 117-1, and outputs the processed data to the downlink data processing unit 121.

The downlink data processing unit 121 has a function of the PDCP layer, performs a function of decompressing (restoring) a compressed IP head and a function of decoding encrypted data, and performs the processing such as the data segmentation and concatenation. The downlink data processing unit 121 performs division into an RRC message and a user data, and outputs the RRC message to the RRC control unit 127, and outputs the user data to the higher layer.

Based on the instruction from the MAC control unit 125-1, the PHY control unit 123-1 controls the transmission processing unit 109-1, the radio unit 111-1, and the reception processing unit 113-1. The PHY control unit 123-1 notifies the transmission processing unit 109-1 of the modulation and coding schemes that are notified by the MAC control unit 125-1, and the modulation and coding schemes and a transmission location that come from the transmit power information and the transmission location information (the transmission cell information), and notifies the radio unit 111-1 of frequency information and transmit power information on a transmission cell.

In the same manner, based on the instruction from the MAC control unit 125-2, the PHY control unit 123-2 controls the transmission processing unit 109-2, the radio unit 111-2, and the reception processing unit 113-2. The PHY control unit 123-2 notifies the transmission processing unit 109-2 of the modulation and coding schemes that are notified by the MAC control unit 125-2, and the modulation and coding schemes and the transmission location that come from the transmit power information and the transmission location information (the transmission cell information), and notifies the radio unit 111-2 of the frequency information and the transmit power information on the transmission cell.

The MAC control unit 125-1 determines a data transmission destination and data transmission priority based on data control configuration that is designated by the RRC control unit 127, information on an amount of data, which is acquired from the transmission data storage unit 105-1, and the uplink transmission approval information that is acquired from the reception processing unit 113-1, and notifies the transmission data storage unit 105-1 of information relating to data that is to be transmitted. Furthermore, the MAC control unit 125-1 notifies the transmission HARQ processing unit 107-1 of HARQ information, and outputs the modulation and coding schemes and the transmission location information to the PHY control unit 123-1.

When a change in a state where pieces of data are accumulated is notified by the transmission data storage unit 105-1, the MAC control unit 125-1 triggers the Buffer Status Report. In a state where the Buffer Status Report is triggered, in a case where the uplink transmission approval information is acquired from the reception processing unit 113-1, the MAC control unit 125-1 instructs the transmission data storage unit 105-1 to report an amount of accumulated data on each logical channel.

When information on the amount of accumulated data on each logical channel is acquired from the transmission data storage unit 105-1, the MAC control unit 125-1 creates the Buffer Status Report, and outputs the created Buffer Status Report to the transmission data storage unit 105-1.

In the state where the Buffer Status Report is triggered, in a case where the uplink transmission approval information is not acquired, the MAC control unit 125-1 determines transmission of the Scheduling Request, and instructs the PHY control unit 123-1 to transmit the Scheduling Request. In a case where the uplink transmission approval information corresponding to the Scheduling Request is acquired, the MAC control unit 125-1 creates the Buffer Status Report, and outputs the created Buffer Status Report to the transmission data storage unit 105-1.

Although the number of times that the Scheduling Request is transmitted is counted and the number of times that the Scheduling Request is transmitted reaches the maximum number of times of transmission, in a case where the uplink transmission approval information is not acquired, the MAC control unit 125-1 instructs the PHY control unit 123-1 to transmit information the random access preamble. Furthermore, the MAC control unit 125-1 notifies the RRC control unit 127 of release of the uplink radio resource that is allocated to the mobile station apparatus itself in which the MAC control unit 125-1 is included.

In a case where a preamble number and a random access channel number are notified by the RRC control unit 127 or the reception processing unit 113-1, the MAC control unit 125-1 starts the random access procedure, and instructs the PHY control unit 123-1 to transmit the random access preamble. Furthermore, the MAC control unit 125-1 notifies the PHY control unit 123-1 of random access response identification information, and instructs the PHY control unit 123-1 to monitor the random access response identification information.

When a random access response message is acquired, the MAC control unit 125-1 outputs transmission timing information that is included in the random access response message, to the PHY control unit 123-1. In a case where the random access response message is not acquired, the MAC control unit 125-1 again instructs the PHY control unit 123-1 to transmit the random access preamble. In a case where the number of times that the random access preamble is transmitted reaches the maximum number of times of transmission, the MAC control unit 125-1 notifies the RRC control unit 127 of a random access failure (or a random access problem).

The MAC control unit 125-1 acquires response information in response to the uplink transmission data from the reception processing unit 113-1, and in a case where the response information indicates the NACK (negative response), instructs the transmission HARQ processing unit 107-1 and the PHY control unit 123-1 to perform retransmission. In a case where information on whether the decoding processing of data succeeds or fails is acquired from the reception HARQ processing unit 115-1, the MAC control unit 125-1 instructs the PHY control unit 123-1 to transmit the ACK or NACK signal.

Furthermore, activation/deactivation instruction information and discontinuous reception (DRX) control information on a cell (or, a component carrier) is acquired from MAC control information that is input from the MAC information extraction unit 117-1, in order to perform activation/deactivation control and DRX control, the MAC control unit 125-1 instructs the PHY control unit 123-1 to perform control of the radio unit 111-1, the transmission processing unit 109-1, and the reception processing unit 113-1.

The MAC control unit 125-1 manages enablement and disablement of an uplink transmission timing, using a transmission timing timer. The MAC control unit 125-1 has a transmission timing timer for every cell or every transmission timing group, and starts or restarts the transmission timing timer that corresponds to a case where transmission timing information is applied to every cell or every transmission timing group. In a case where the transmitting timing timer expires, the MAC control unit 125-1 stops uplink transmission to a cell for which the transmission timing timer expires.

The MAC control unit 125-1 outputs to the PHY control unit 123-1 the transmission timing information in the MAC control information that is input from the MAC information extraction unit 117-1. The MAC control unit 125-1 manages an uplink transmission timing, and controls the PHY control unit 123-1.

In a case where a change in reception quality that is acquired from the reception processing unit 113-1 occurs or where a timer associated with the Power Headroom Report expires, the MAC control unit 125-1 triggers the Power Headroom Report. In a state where the Power Headroom Report is triggered, in a case where the uplink transmission approval information is present, the MAC control unit 125-1 creates the Power Headroom Report and outputs the created Power Headroom Report to the transmission data storage unit 105-1.

In a case where the RRC control unit 127 provides an instruction for MAC reset, the MAC control unit 125-1 stops or resets a timer (for example, a timer associated with the Buffer Status Report, a timer associated with the Power Headroom Report, or the transmission timing timer) in operation, and cancels various types of triggering (for example, triggering associated with the Buffer Status Report or triggering associated with the Power Headroom Report).

Furthermore, the MAC control unit 125-1 flushes data that is retained in the reception HARQ processing unit 115-1 and the transmission HARQ processing unit 107-1. Furthermore, the MAC control unit 125-1 performs processing, such as deleting the preamble number and the random access channel number that are notified, and stopping the random access procedure in operation.

The MAC control unit 125-2 performs the same processing as the MAC control unit 125-1, and controls the transmission data storage unit 105-2, the transmission HARQ processing unit 107-2, the reception HARQ processing unit 115-2, the MAC information extraction unit 117-2, and the PHY control unit 123-2.

The RRC control unit 127 performs various configurations for performing communication between the base station apparatus 3-1 and the base station apparatus 3-2, such as cell (base station apparatus) selection, processing that makes or releases an RRC connection to the base station apparatus 3-1, a carrier aggregation configuration, a dual connectivity configuration, and data control configurations of the control data or the user data. The RRC control unit 127 performs exchanging of information between the RRC control unit 127 itself and the higher layer that accompanies the various configurations, and performs control of the lower layer that accompanies the various configurations. The RRC control unit 127 manages radio resource for each cell, which is allocated by the base station apparatus 3-1.

The RRC control unit 127 creates an RRC message, and outputs the created RRC message to the uplink data processing unit 101. The RRC control unit 127 interprets the RRC message that is input from the downlink data processing unit 121.

The RRC control unit 127 outputs information indispensable for the PDCP layer to the uplink data processing unit 101 and the downlink data processing unit 121, and outputs information indispensable for the RLC layer to the uplink control unit 103-1, the uplink control unit 103-2, the downlink control unit 119-1, and the downlink control unit 119-2. Furthermore, the RRC control unit 127 outputs information indispensable for the MAC layer to the MAC control unit 125-1 or the MAC control unit 125-2, and outputs information indispensable for the physical layer to the PHY control unit 123-1 or the PHY control unit 123-2.

In a case where data control configuration information is acquired such as the logical channel for each piece of data, a priority level of the logical channel for each piece of data, information indicating a relationship between the logical channel for each piece of control data and the logical channel group, and information on relationship between the base station apparatus (the cell or the cell group) and the logical channel, the RRC control unit 127 outputs data transmission control configuration information to the MAC control unit 125. Furthermore, in a case where it is recognized that the communication between the base station apparatus 3-1 and the base station apparatus 3-2 is performed using the Dual Connect, the RRC control unit 127 notifies the MAC control unit 125 that the Dual Connect is in a state of being in operation.

In a case where the RLC failure is notified by the uplink control unit 103-1, the RRC control unit 127 releases a connection to the base station apparatus 3-1, makes a cell selection, and starts processing that makes a connection to the base station apparatus in the selected cell.

In a case where the RLC failure is notified by the uplink control unit 103-2, the RRC control unit 127 instructs the uplink data processing unit to destroy data for the base station apparatus 3-2. The RRC control unit 127 instructs the uplink control unit 103-2 to perform RLC re-establishment by the uplink control unit 103-2. The RRC control unit 127 instructs the MAC control unit 125-2 to perform the MAC reset.

Furthermore, in a case where the uplink radio resource, such as the Physical Uplink Control Channel (PUCCH), the uplink reference signal, or the like that is allocated to a cell of the base station apparatus 3-2 is retained, the RRC control unit 127 releases the uplink radio resource that is a target. The RRC control unit 127 deletes (or releases) information (the physical random access configuration information or the random access procedure configuration information) for executing the random access procedure for a cell that is a target.

In a case where the random access failure is notified by the MAC control unit 125-1, the RRC control unit 127 determines the connection to the base station apparatus 3-1, makes the cell selection, and starts the processing that makes the connection to the base station apparatus in the selected cell.

In a case where the random access failure is notified by the MAC control unit 125-2, the RRC control unit 127 instructs the uplink data processing unit to destroy the data for the base station apparatus 3-2. The RRC control unit 127 instructs the uplink control unit 103-2 to perform RLC re-establishment by the uplink control unit 103-2. The RRC control unit 127 instructs the MAC control unit 125-2 to perform the MAC reset by the MAC control unit 125-2.

Furthermore, in the case where the uplink radio resource, such as the Physical Uplink Control Channel (PUCCH) or the uplink reference signal that is allocated to the cell of the base station apparatus 3-2 is retained, the RRC control unit 127 releases the uplink radio resource that is a target. The RRC control unit 127 deletes the information (the physical random access configuration information or the random access procedure configuration information) for executing the random access procedure for the cell that is a target.

In a case where release of the uplink radio resource is notified by the MAC control unit 125-1 or the MAC control unit 125-2, the RRC control unit 127 releases an uplink radio resource, such as the Physical Uplink Control Channel (PUCCH) or the uplink reference signal that is allocated to the cell that is a target.

Moreover, the transmission processing unit 109-1, the transmission processing unit 109-2, the radio unit 111-1, the radio unit 111-2, the reception processing unit 113-1, the reception processing unit 113-2, the PHY control unit 123-1, and the PHY control unit 123-2 perform operation of the Physical Layer. The transmission data storage unit 105-1, the transmission data storage unit 105-2, the transmission HARQ processing unit 107-1, the transmission HARQ processing unit 107-2, the reception HARQ processing unit 115-1, the reception HARQ processing unit 115-2, the MAC information extraction unit 117-1, the MAC information extraction unit 117-2, the MAC control unit 125-1, and the MAC control unit 125-2 perform operation of the MAC layer.

The uplink control unit 103-1, the uplink control unit 103-2, the downlink control unit 119-1, and the downlink control unit 119-2 performs operation of the RLC layer. The uplink data processing unit 101 and the downlink data processing unit 121 performs operation of the PDCP layer, and the RRC control unit 127 performs operation of the RRC layer.

Figure 2:
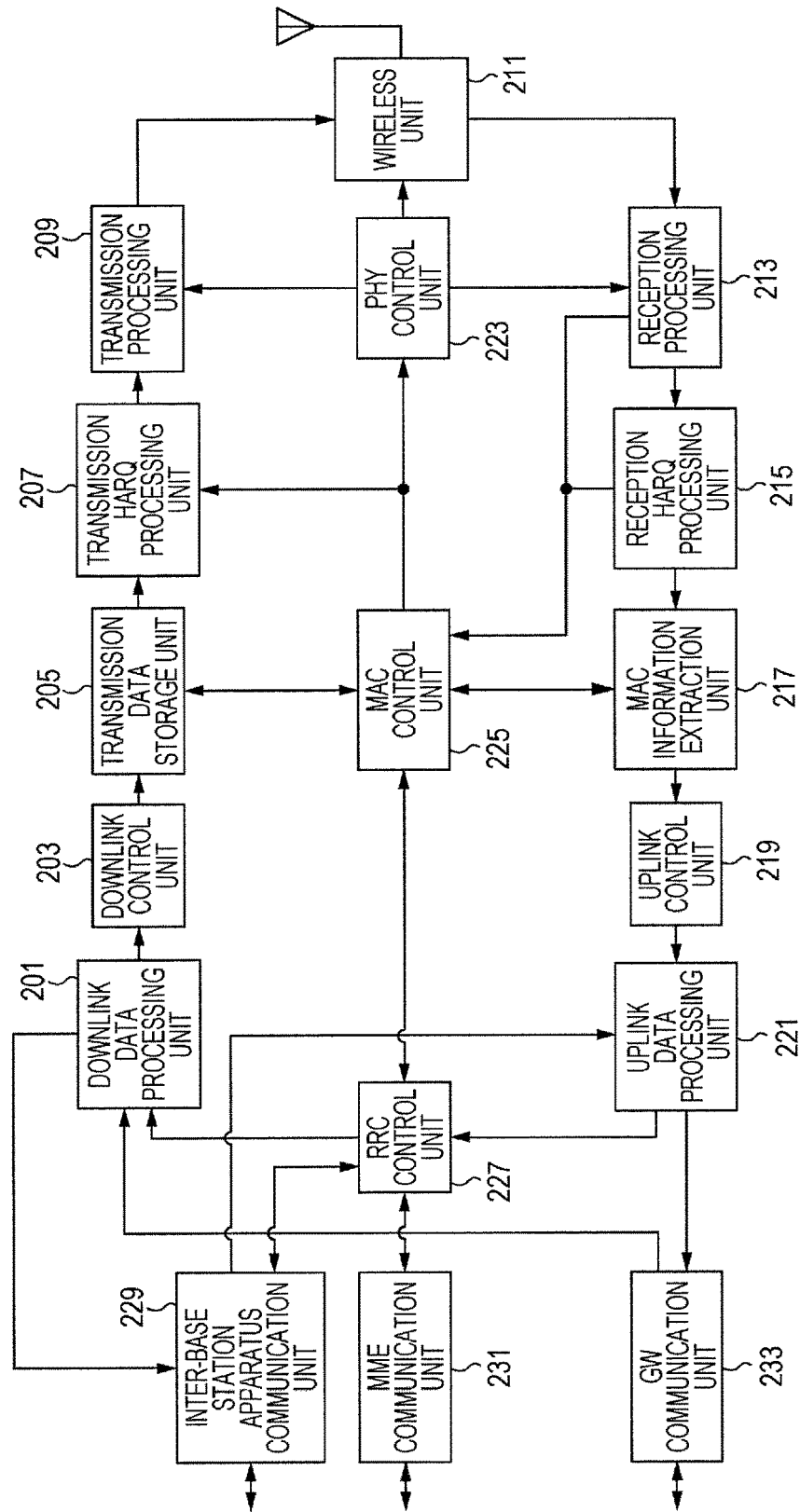
FIG. 2 is a diagram illustrating one example of a constitution of a base station apparatus according to the embodiment of the present invention.

FIG. 2 is a diagram illustrating a constitution of a base station apparatus according to the embodiment of the present invention. The base station apparatus 3-1 is constituted from a downlink data processing unit 201, a downlink control unit 203, a transmission data storage unit 205, a transmission HARQ processing unit 207, a transmission processing unit 209, a radio unit 211, a reception processing unit 213, a reception HARQ processing unit 215, a MAC information extraction unit 217, an uplink control unit 219, an uplink data processing unit 221, a PHY control unit 223, a MAC control unit 225, an RRC control unit 227, an inter-base station apparatus communication unit 229, an MME communication unit 231, and a GW communication unit 233.

The user data from the GW communication unit 233 and the control data from the RRC control 227 are input from the downlink data processing unit 201. The downlink data processing unit 201 has a function of the PDCP layer. The downlink data processing unit 201 performs the processing operations, such as the head compression of or the data encryption of the IP packet of the user data, the data segmentation and concatenation, and adjusts the data size. The downlink data processing unit 201 outputs data on which the processing is performed, to the downlink control unit 203 or the inter-base station apparatus communication unit 229.

Moreover, the downlink data processing unit 201 outputs data to the downlink control unit 203 or the inter-base station apparatus communication unit 229, taking into consideration at least one of downlink wireless channel quality information, an amount of downlink data for the mobile station apparatus 1-1, and an amount of transmission data (an amount of traffic) for all mobile station apparatuses in the base station apparatus 3-1 or the base station apparatus 3-2.

The downlink control unit 203 has a function of the RLC layer. The downlink control unit 203 performs the processing, such as the data segmentation and concatenation, on data that is input from the downlink data processing unit 201, and adjusts the data size. Furthermore, the downlink control unit 203 performs the retransmission on specific data. The downlink control unit 203 outputs the data on which the processing is performed, to the transmission data storage unit 205.

The transmission data storage unit 205 accumulates pieces of data that are input from the downlink control unit 203, for every user, and outputs as much data as the transmission data storage unit 205 is instructed to output based on an instruction from the MAC control unit 225, to the transmission HARQ processing unit 207. Furthermore, the transmission data storage unit 205 outputs information on an amount of data that is accumulated, to the MAC control unit 225.

The transmission HARQ processing unit 207 performs the coding on data that is input, and performs the puncture processing on the coded data. Then, the transmission HARQ processing unit 207 outputs punctured data to the transmission processing unit 209, and retains the coded data. In a case where the transmission HARQ processing unit 207 is instructed by the MAC control unit 225 to retransmit data, the transmission HARQ processing unit 207 performs different puncture from the puncture that is previously performed, referring to the coded data that is retained, and outputs the punctured data to the transmission processing unit 209.

The transmission processing unit 209 performs the modulation and coding on data that is input from the transmission HARQ processing unit 207. The transmission processing unit 209 maps the modulated and coded data to a signal and each channel, such as the Physical Downlink Control Channel (PDCCH), the downlink synchronizing signal, the Physical Broadcast Channel (PBCH), and the Physical Downlink Shared Channel (PDSCH), for each cell, performs OFDM signal processing, such as serial/parallel conversion, Inverse Fast Fourier Transform (IFFT), and CP insertion, on data that results from the mapping, and generates an OFDM signal.

Then, the transmission processing unit 209 outputs the generated OFDM signal to the radio unit 211. Furthermore, in a case where the transmission processing unit 209 is instructed by the MAC control unit 225 to provide a response to reception data, the transmission processing unit 209 generates the ACK or NACK signal, maps the generated signal to the Physical Downlink Control Channel (PDCCH), and outputs the resulting signal to the radio unit 211. The transmission processing unit 209 maps the uplink transmission approval information that is notified by the PHY control unit 223, to the Physical Downlink Control Channel (PDCCH), and outputs the resulting information to the radio unit 211.

The radio unit 211 up-converts data that is input from the transmission processing unit 209, into a wireless frequency, adjusts transmit power, and transmits the resulting data from the transmit antenna. Furthermore, the radio unit 211 down-converts a wireless signal that is received from the receive antenna, and outputs the resulting signal to the reception processing unit 213. The reception processing unit 213 performs the Fast Fourier Transform (FFT) processing, the decoding, the demodulation processing, and the like on a signal that is input from the radio unit 211.

Among pieces of demodulated data, the reception processing unit 213 outputs data on the Physical Uplink Shared Channel (PUSCH) to the reception HARQ processing unit 215. Furthermore, among the pieces of modulated data, the reception processing unit 213 outputs response information (ACK/NACK) of downlink transmission data, downlink wireless channel quality information (CQI), and uplink transmission request information (the Scheduling Request) in control data that is acquired from the Physical Uplink Control Channel (PUCCH), to the MAC control unit 225. Furthermore, the reception processing unit 213 measures the uplink reference signal, and measures the uplink wireless channel quality between the base station apparatus 3-1 and the mobile station apparatus 1-1.

The reception HARQ processing unit 215 performs the decoding processing of the data that is input from the reception processing unit 213, and in the case where the decoding processing succeeds, outputs the resulting data to the MAC information extraction unit 217. In the case where the decoding processing of the data that is input fails, the reception HARQ processing unit 215 retains the data of which the decoding processing fails. In the case where the data that is retransmitted is received, the reception HARQ processing unit 215 composites the data that is retained and the data that is retransmitted, and performs the decoding processing on the resulting data. Furthermore, the reception HARQ processing unit 215 notifies the MAC control unit 225 whether or not the decoding processing of the data that is input succeeds.

The MAC information extraction unit 217 extracts control data on the MAC layer from the data that is input from the reception HARQ processing unit 215, and outputs the extracted control data to the MAC control unit 225. The MAC information extraction unit 217 outputs the remaining data to the uplink control unit 219. Pieces of control data on the MAC layer include the Buffer Status Report and the like.

The uplink control unit 219 has a function of the RLC layer. The uplink control unit 219 performs the processing, such as the data segmentation and concatenation, on data that is input from the MAC information extraction unit 217, and adjusts the data size. Furthermore, the uplink control unit 219 performs the retransmission on specific data. The uplink control unit 219 outputs the processed data to the uplink data processing unit 221.

The uplink data processing unit 221 has a function of the PDCP layer. The uplink data processing unit 221 performs the function of decompressing (restoring) a compressed IP head and the function of decoding encrypted data, and performs the processing such as the data segmentation and concatenation. The uplink data processing unit 221 performs the division into the RRC message and the user data, and outputs the RRC message to the RRC control unit 227, and outputs the user data to the GW communication unit 233.

Based on the instruction from the MAC control unit 225, the PHY control unit 223 controls the transmission processing unit 209, the radio unit 211, and the reception processing unit 213. The PHY control unit 223 creates uplink transmission approval information from a result of uplink scheduling, which is notified by the MAC control unit 225, and notifies the transmission processing unit 209 of the created uplink transmission approval information.

The MAC control unit 225 has a function of the MAC layer. The MAC control unit 225 performs control of the MAC layer based on information that is acquired from the RRC control unit 227, the lower layer, or the like. The MAC control unit 225 performs scheduling processing of data that is transmitted in the downlink and the uplink. The MAC control unit 225 performs the scheduling processing of the downlink data, referring to the response information (ACK/NACK) of the downlink transmission data and the downlink wireless channel quality information (CQI), which are input from the reception processing unit 213, and information on an amount of data for every user, which is acquired from the transmission data storage unit 205. Based on a result of the scheduling processing, the MAC control unit 225 controls the transmission data storage unit 205, the transmission HARQ processing unit 207, and the transmission processing unit 209.

The MAC control unit 225 performs the scheduling processing of the uplink data, referring to the uplink transmission information (the Scheduling Request), which is input from the reception processing unit 213, and the Buffer Status Report and the Power Headroom Report, which are input from the MAC information extraction unit 217. The MAC control unit 225 notifies the PHY control unit 223 of a result of the scheduling processing.

Furthermore, the MAC control unit 225 acquires the response information in response to the uplink transmission data from the reception processing unit 213, and in the case where the response information indicates the NACK (negative response), instructs the transmission HARQ processing unit 207 and the transmission processing unit 209 to perform the retransmission. In a case where the information on whether the decoding processing of data succeeds or fails is acquired from the reception HARQ processing unit 215, the MAC control unit 225 instructs the transmission processing unit 209 to transmit the ACK or NACK signal.

Furthermore, the MAC control unit 225 performs activation/deactivation processing of a cell (or a component carrier) that is allocated to the mobile station apparatus 1-1. The MAC control unit 225 performs management and the like of the transmission timing group and the uplink transmission timing in each transmission timing group.

The RRC control unit 227 performs various configurations for performing communication with the mobile station apparatus 1-1, such as the processing that makes or releases the RRC connection to the mobile station apparatus 1-1, handover processing, the Carrier Aggregation configuration, the dual connectivity configuration, and the data control configuration for which cell (or which base station apparatus) is used to transmit and receive control data and user data of the mobile station apparatus 1-1 at the time of the Dual Connect, performs exchanging of information between the RRC control unit 227 itself and the higher layer that accompanies the various configuration, and performs control of the lower layer that accompanies the various configurations.

The RRC control unit 227 creates various RRC messages, and outputs the created RRC messages to the downlink data processing unit 201. The RRC control unit 227 interprets the RRC message that is input from the uplink data processing unit 221.

The RRC control unit 227 outputs the information indispensable for the PDCP layer to the downlink data processing unit 201 and the uplink data processing unit 221, and outputs the information indispensable for the RLC layer to the downlink control unit 203 and the uplink control unit 219.

Furthermore, the RRC control unit 227 outputs the information indispensable for the MAC layer to the MAC control unit 225, and outputs the information indispensable for the physical layer to the PHY control unit 223. Furthermore, in a case where the handover or the Dual Connect is performed, the RRC control unit 227 notifies information indispensable for the inter-base station apparatus communication unit 229 and the MME communication unit 231.

The inter-base station apparatus communication unit 229 makes a connection to a different base station apparatus (the base station apparatus 3-2), and transmits a control message between the base station apparatuses, which is input from the RRC control unit 227, to the base station apparatus 3-2. Furthermore, the inter-base station apparatus communication unit 229 receives the control message between the base station apparatuses from the base station apparatus 3-2, and outputs the received control message to the RRC control unit 227. Control messages between the base station apparatuses include a message relating to the handover, a control message relating to a connection for the Dual Connect and release of the connection for the Dual Connect, a message relating to data control by the mobile station apparatus 1-1, and the like.

Furthermore, the inter-base station apparatus communication unit 229 transmits downlink user data of the mobile station apparatus 1-1 that performs the Dual Connect, to the base station apparatus 3-2. The inter-base station apparatus communication unit 229 receives uplink user data of the mobile station apparatus 1-1 that performs the Dual Connect, from the base station apparatus 3-2, and outputs the received data to the uplink data processing unit 221.

The MME communication unit 231 makes a connection to the Mobility Management Entity (MME), and transmits a control message (an S1 message) between the base station apparatus and the MME, which is input from the RRC control unit 227, to the MME. Furthermore, the MME communication unit 231 receives the control message between the base station apparatus and the MME from the MME, and outputs the received control message to the RRC control unit 227. Control messages between the base station apparatus and the MME include a path switch request message, a path switch request response message, and the like.

The inter-GW communication unit 233 makes a connection to the gateway (GW), receives the user data of the mobile station apparatus 1-1, which is sent from the GW, and outputs the received data to the downlink data processing unit 201. Furthermore, the inter-GW communication unit 233 transmits the user data of the mobile station apparatus 1-1, which is input from the uplink data processing unit 221, to the GW.

Moreover, the transmission processing unit 209, the radio unit 211, the reception processing unit 213, and the PHY control unit 223 perform operation of the PHY layer. The transmission data storage unit 205, the transmission HARQ processing unit 207, the reception HARQ processing unit 215, the MAC information extraction unit 217, and the MAC control unit 225 perform the operation of the MAC layer. The downlink control unit 203 and the uplink control unit 219 performs the operation of the RLC layer. The downlink data processing unit 201 and the uplink data processing unit 221 perform the operation of the PDCP layer. The RRC control unit 227 performs the operation of the RRC layer.

Figure 3:
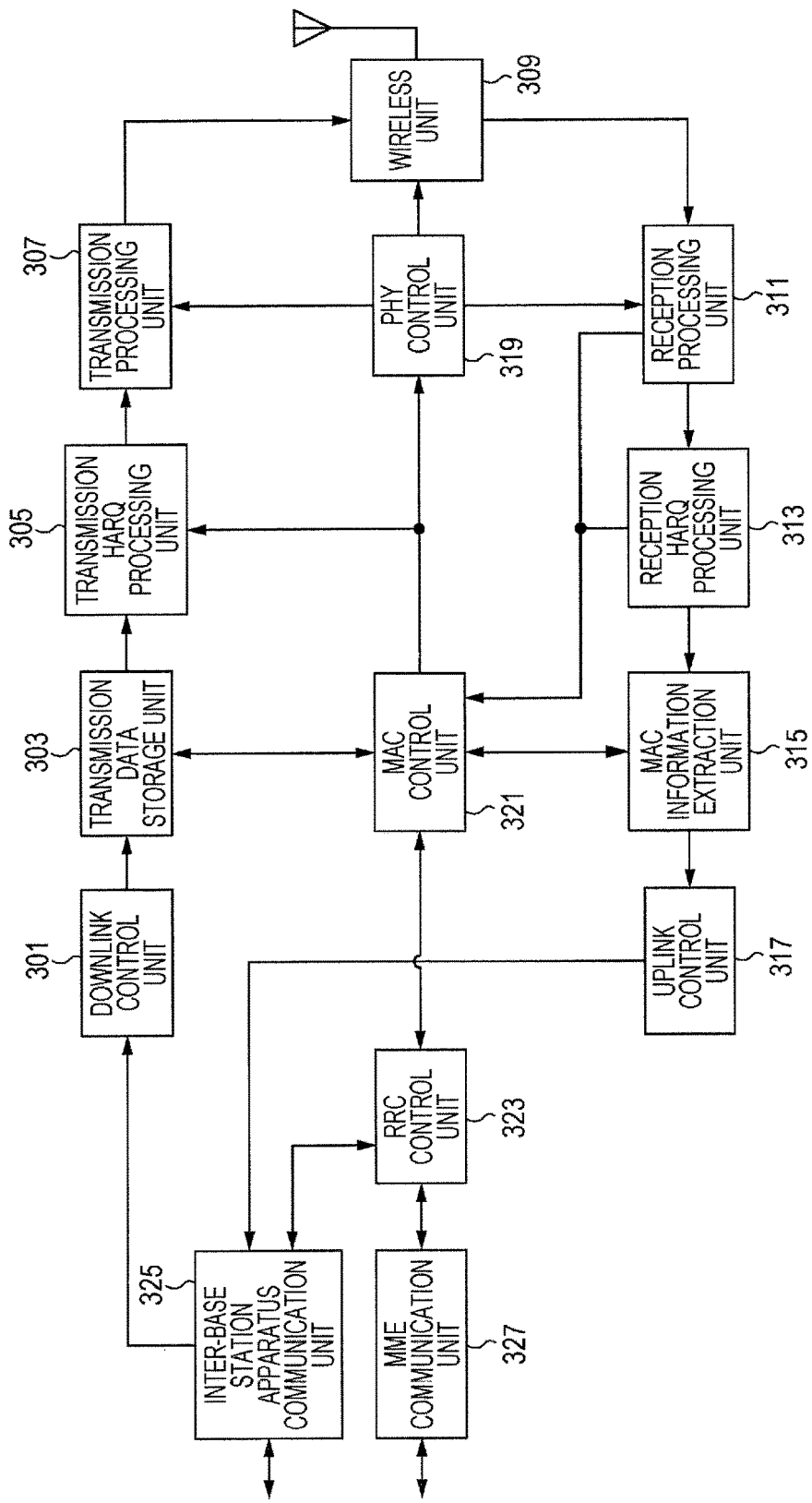
FIG. 3 is a diagram illustrating one example of the constitution of the base station apparatus according to the embodiment of the present invention.

FIG. 3 is a diagram illustrating a constitution of a base station apparatus according to the embodiment of the present invention. The base station apparatus 3-2 is constituted from a downlink control unit 301, a transmission data storage unit 303, a transmission HARQ processing unit 305, a transmission processing unit 307, a radio unit 309, a reception processing unit 311, a reception HARQ processing unit 313, a MAC information extraction unit 315, an uplink control unit 317, a PHY control unit 319, a MAC control unit 321, an RRC control unit 323, an inter-base station apparatus communication unit 325, and an MME communication unit 327.

The user data from the inter-base station apparatus communication unit 325 is input into the downlink control unit 301. The downlink control unit 301 has the function of the RLC layer, performs the processing, such as the data segmentation and concatenation, on data that is input from the inter-base station apparatus communication unit 325, and adjusts the data size. Furthermore, the downlink control unit 301 performs the retransmission on specific data. The downlink control unit 301 outputs the data on which the processing is performed, to the transmission data storage unit 303.

The transmission data storage unit 303 accumulates pieces of data that are input from the downlink control unit 301, for every user, and outputs as much data as the transmission data storage unit 303 is instructed to output based on an instruction from the MAC control unit 321, to the transmission HARQ processing unit 305. Furthermore, the transmission data storage unit 303 outputs information on an amount of data that is accumulated, to the MAC control unit 321.

The transmission HARQ processing unit 305 performs the coding on data that is input, and performs the puncture processing on the coded data. Then, the transmission HARQ processing unit 305 outputs punctured data to the transmission processing unit 307, and retains the coded data. In a case where the transmission HARQ processing unit 305 is instructed by the MAC control unit 321 to retransmit data, the transmission HARQ processing unit 305 performs different puncture from the puncture that is previously performed, referring to the coded data that is retained, and outputs the punctured data to the transmission processing unit 307.

The transmission processing unit 307 performs the modulation and coding on data that is input from the transmission HARQ processing unit 305. The transmission processing unit 307 maps the modulated and coded data to a signal and each channel, such as the Physical Downlink Control Channel (PDCCH), the downlink synchronizing signal, the Physical Broadcast Channel (PBCH), and the Physical Downlink Shared Channel (PDSCH), for each cell, performs the OFDM signal processing, such as the serial/parallel conversion, the Inverse Fast Fourier Transform (IFFT), and the CP insertion, on data that results from the mapping, and generates an OFDM signal.

Then, the transmission processing unit 307 outputs the generated OFDM signal to the radio unit 309. Furthermore, in a case where the transmission processing unit 307 is instructed by the MAC control unit 321 to provide a response to reception data, the transmission processing unit 307 generates the ACK or NACK signal, maps the generated signal to the Physical Downlink Control Channel (PDCCH), and outputs the resulting signal to the radio unit 309. The transmission processing unit 307 maps the uplink transmission approval information that is notified by the PHY control unit 319, to the Physical Downlink Control Channel (PDCCH), and outputs the resulting information to the radio unit 309.

The radio unit 309 up-converts data that is input from the transmission processing unit 307, into a wireless frequency, adjusts the transmit power, and transmits the resulting data from the transmit antenna. Furthermore, the radio unit 309 down-converts a wireless signal that is received from the receive antenna, and outputs the resulting signal to the reception processing unit 311. The reception processing unit 311 performs the Fast Fourier Transform (FFT) processing, the decoding, the demodulation processing, and the like on a signal that is input from the radio unit 309.

Among pieces of demodulated data, the reception processing unit 311 outputs data on the Physical Uplink Shared Channel (PUCCH) to the reception HARQ processing unit 313. Furthermore, among the pieces of modulated data, the reception processing unit 311 outputs response information (ACK/NACK) of downlink transmission data, downlink wireless channel quality information (CQI), and uplink transmission request information (the Scheduling Request) in control data that is acquired from the Physical Uplink Control Channel (PUCCH), to the MAC control unit 321. Furthermore, the reception processing unit 313 measures the uplink reference signal, and measures the uplink wireless channel quality between the base station apparatus 3-2 and the mobile station apparatus 1-1.

The reception HARQ processing unit 313 performs the decoding processing of the data that is input from the reception processing unit 311, and in the case where the decoding processing succeeds, outputs the resulting data to the MAC information extraction unit 315. In the case where the decoding processing of the data that is input fails, the reception HARQ processing unit 313 retains the data of which the decoding processing fails. In the case where the data that is retransmitted is received, the reception HARQ processing unit 313 composites the data that is retained and the data that is retransmitted, and performs the decoding processing on the resulting data. Furthermore, the reception HARQ processing unit 313 notifies the MAC control unit 321 whether or not the decoding processing of the data that is input succeeds.

The MAC information extraction unit 315 extracts control data on the MAC layer from the data that is input from the reception HARQ processing unit 313, and outputs the extracted control data to the MAC control unit 321. The MAC information extraction unit 315 outputs the remaining data to the uplink control unit 317. Pieces of control data on the MAC layer include the Buffer Status Report and the like.

The uplink control unit 317 has the function of the RLC layer. The uplink control unit 317 performs the processing, such as the data segmentation and concatenation, on data that is input from the MAC information extraction unit 315, and adjusts the data size. Furthermore, the uplink control unit 317 performs the retransmission on specific data. The uplink control unit 317 outputs the data on which the processing is performed, to the inter-base station apparatus communication unit 325.

Based on the instruction from the MAC control unit 321, the PHY control unit 319 controls the transmission processing unit 307, the radio unit 309, and the reception processing unit 311. The PHY control unit 319 creates uplink transmission approval information from a result of uplink scheduling, which is notified by the MAC control unit 321, and notifies the transmission processing unit 307 of the created uplink transmission approval information.

The MAC control unit 321 has the function of the MAC layer. The MAC control unit 321 performs the control of the MAC layer based on information that is acquired from the RRC control unit 323, the lower layer, or the like. The MAC control unit 321 performs the scheduling processing of data that is transmitted in the downlink and the uplink. The MAC control unit 321 performs the scheduling processing of the downlink data, referring to the response information (ACK/NACK) of the downlink transmission data and the downlink wireless channel quality information (CQI), which are input from the reception processing unit 311, and information on an amount of data for every user, which is acquired from the transmission data storage unit 303. Based on a result of the scheduling processing, the MAC control unit 321 controls the transmission data storage unit 303, the transmission HARQ processing unit 305, and the transmission processing unit 307.

The MAC control unit 321 performs the scheduling processing of the uplink data, referring to the uplink transmission information (the Scheduling Request), which is input from the reception processing unit 311, and the Buffer Status Report, which is input from the MAC information extraction unit 315. The MAC control unit 321 notifies the PHY control unit 319 of a result of the scheduling processing.

Furthermore, the MAC control unit 321 acquires the response information in response to the uplink transmission data from the reception processing unit 311, and in the case where the response information indicates the NACK (negative response), instructs the transmission HARQ processing unit 305 and the transmission processing unit 307 to perform the retransmission. In a case where the information on whether the decoding processing of data succeeds or fails is acquired from the reception HARQ processing unit 313, the MAC control unit 321 instructs the transmission processing unit 307 to transmit the ACK or NACK signal.

Furthermore, the MAC control unit 321 performs the activation/deactivation processing of a cell (or a component carrier) that is allocated to the mobile station apparatus 1-1. The MAC control unit 321 performs the management and the like of the transmission timing group and the uplink transmission timing in each transmission timing group.

The RRC control unit 323 performs various configurations for performing communication with the mobile station apparatus 1-1, such as the processing that makes or releases the connection to the mobile station apparatus 1-1, the carrier aggregation configuration, and the data control configuration for which cell is used to transmit and receive the control data and the user data of the mobile station apparatus 1-1, performs the exchanging of information between the RRC control unit 323 itself and the higher layer that accompanies the various configuration, and performs control of the lower layer that accompanies the various configurations.

The RRC control unit 323 creates the control message between the base station apparatuses, and outputs the created control message to the inter-base station apparatus communication unit 325. The RRC control unit 323 interprets the control message between the base station apparatuses from the inter-base station apparatus communication unit 325. The RRC control unit 323 outputs the information indispensable for the MAC layer to the MAC control unit 321, and outputs the information indispensable for the physical layer to the PHY control unit 319. Furthermore, in a case where the handover or the Dual Connect is performed, the RRC control unit 323 notifies information indispensable for the inter-base station apparatus communication unit 325 and the MME communication unit 327.

The inter-base station apparatus communication unit 325 makes a connection to a different base station apparatus (the base station apparatus 3-1), and transmits a control message between the base station apparatuses, which is input from the RRC control unit 323, to the base station apparatus 3-1. Furthermore, the inter-base station apparatus communication unit 325 receives the control message between the base station apparatuses from the base station apparatus 3-1, and outputs the received control message to the RRC control unit 323. That is, in the Dual Connect, various configurations relating to a radio link between the base station apparatus 3-2 and the mobile station apparatus 1-1 is notified to the mobile station apparatus 1-1 through the base station apparatus 3-1. Control messages between the base station apparatuses include a message relating to the handover, a control message relating to a connection for the Dual Connect and release of the connection for the Dual Connect, a message relating to data control by the mobile station apparatus 1-1, and the like.

Furthermore, the inter-base station apparatus communication unit 325 transmits the uplink user data of the mobile station apparatus 1-1 that performs the Dual Connect, to the base station apparatus 3-1. The inter-base station apparatus communication unit 325 receives the downlink user data of the mobile station apparatus 1-1 that performs the Dual Connect, from the base station apparatus 3-1, and outputs the received data to the downlink control unit 301.

The MME communication unit 327 makes a connection to the Mobility Management Entity (MME), and transmits the control message between the base station apparatus and the MME, which is input from the RRC control unit 323, to the MME. Furthermore, the MME communication unit 327 receives the control message between the base station apparatus and the MME from the MME, and outputs the received control message to the RRC control unit 323. The control messages between the base station apparatus and the MME include the path switch request message, the path switch request response message, and the like.

Moreover, the transmission processing unit 307, the radio unit 309, the reception processing unit 311, and the PHY control unit 319 perform the operation of the PHY layer. The transmission data storage unit 303, the transmission HARQ processing unit 305, the reception HARQ processing unit 313, the MAC information extraction unit 315, and the MAC control unit 321 perform the operation of the MAC layer. The downlink control unit 301 and the uplink control unit 317 performs the operation of the RLC layer. The RRC control unit 323 performs the operation of the RRC layer.

[Operation Description]

The wireless communication system as described referring to FIGS. 6 to 13 is assumed. Then, as illustrated in FIG. 6, the base station apparatus 3-1 and the multiple mobile station apparatuses 1-1, 1-2, and 1-3 performs communication. Furthermore, the wireless communication system is assumed in which the base station apparatus 3-1 in the Macro Cell and the base station apparatus 3-2 in the Small Cell, which are described referring to FIG. 11, and the mobile station apparatus 1-1 are set to perform the communication through multiple cells.

Furthermore, as illustrated in FIG. 13, the mobile station apparatus 1-1 makes connections to the base station apparatus 3-1 and the base station apparatus 3-2, using the Dual Connect. The transmission and reception of the control information (the control data) or the user information (the user data) are performed between the base station apparatus 3-1 in the Macro Cell and the mobile station apparatus 1-1. The transmission and reception of the user information are performed between the base station apparatus 3-2 in the Small Cell and the mobile station apparatus 1-1.

The base station apparatus 3-1 and the base station apparatus 3-2 are described below as making connections to the mobile station apparatus 1-1, through a cell 1 and a cell 2, respectively, for descriptions of operations of the base station apparatus and the mobile station apparatus. Moreover, each base station apparatus may allocate multiple cells to the mobile station apparatus 1-1. The cell 1 (a cell group 1) and the cell 2 (a cell group 2) may be configured as a mater cell group (MCG) and a secondary cell group (SCG), respectively.

In a case where the base station apparatus 3-1 determines that in order to perform the communication, the base station apparatus 3-1 makes a connection to the mobile station apparatus 1-1 while making a connection to the base station apparatus 3-2 using the Dual Connect, the base station apparatus 3-1 transmits a dual connectivity connection request message (or secondary cell group addition message) to the base station apparatus 3-2. Included in the dual connectivity connection request message are communication capability information of the mobile station apparatus 1-1, radio resource configuration information on a cell (a cell group) of the base station apparatus 3-1, which is allocated by the base station apparatus 3-1 to the mobile station apparatus 1-1, and the like.

When receiving the dual connectivity connection request message, the base station apparatus 3-2 transmits a dual connectivity connection request response message (or a secondary cell group amendment request message) to the base station apparatus 3-1. Included in the dual connectivity connection request response message are radio resource configuration information on a cell (a cell group) of the base station apparatus 3-2, which is allocated by the base station apparatus 3-2 to the mobile station apparatus 1-1, and the like.

The radio resource configuration information on the cell (the cell group) of the base station apparatus includes radio bearer configuration information, physical layer configuration information, MAC layer configuration information, physical channel configuration information, random access procedure configuration information, and configuration information on the cell group. Moreover, the physical channel configuration information and the random access procedure configuration information are configuration information of every cell or every base station apparatus, and the radio bearer configuration information, the physical layer configuration information and the MAC layer configuration information are configuration information of every mobile station apparatus.

The physical channel configuration information includes physical random access channel configuration information, physical downlink shared channel configuration information, physical uplink shared channel configuration information, physical downlink control channel configuration information, physical uplink control channel configuration information, and the like. Moreover, the physical channel configuration information includes constitution (mapping) information on each physical channel of each cell, generation information on a transmit signal, demodulation information on a receive signal, and the like.

The physical layer configuration information includes allocation information on the Uplink Shared Channel, downlink wireless quality report configuration information, uplink reference signal allocation information, uplink transmit power information, scheduling request configuration information, and the like. Moreover, the physical layer configuration information includes information for control of the Physical Layer, which is allocated to the mobile station apparatus 1-1.

The MAC layer configuration information includes discontinuous reception operation configuration information, buffer status report configuration information, power headroom report configuration information, transmission timing group configuration information, transmission timing timer configuration information, and the like.

The radio bearer configuration information includes control radio bearer information to be added, data radio bearer information to be added, and data radio bearer information to be deleted. The control radio bearer information to be added includes logical channel configuration information on the radio bearer, RLC layer configuration information, and the like. The data radio bearer information to be added includes logical channel configuration information on the radio bearer, information indicating a relationship between the radio bearer and transmission/reception cell, RLC layer configuration information, PDCP layer configuration information, and the like. The logical channel configuration information includes a priority level of the logical channel, information indicating a relationship between the logical channel and the Logical Channel Group (LCG), and the like.

Moreover, the information indicating the relationship between the radio bearer and the transmission/reception cell may be information indicating a relationship between the radio bearer and the cell group, and may be information indicating a relationship between the radio bearer and the MAC layer. Furthermore, the radio bearer configuration information may be created by the base station apparatus 3-1. Furthermore, the control radio bearer information to be added may be set to be included only in the radio bearer configuration information of the base station apparatus 3-1 in the Macro Cell. Furthermore, the radio bearer configuration information may include bearer split control information on which base station apparatus data for splitting the bearer is preferentially transmitted to and so forth. Furthermore, in a case where the same bearer is configured for each cell (each base station apparatus), the mobile station apparatus 1-1 may recognize that such a bearer results from the Bearer Split.

When receiving the dual connectivity connection request response message, the base station apparatus 3-1 transmit a dual connectivity configuration message (or an RRC connection reconfiguration message) indicating addition of the cell (the cell group) of the base station apparatus 3-2, the mobile station apparatus 1-1. The dual connectivity configuration message includes radio resource configuration information on the cell (the cell group) of the base station apparatus 3-2, which is included in the dual connectivity connection request response message and which is allocated by the base station apparatus 3-2 to the mobile station apparatus 1-1. Moreover, the dual connectivity configuration message may include radio resource configuration information on the cell (the cell group) of the base station apparatus 3-1, which is allocated by the base station apparatus 3-1 to the mobile station apparatus 1-1.

When receiving the dual connectivity configuration message, the mobile station apparatus 1-1 configures radio resource configuration information on the cell (the cell group) of the base station apparatus 3-2, which is included in the dual connectivity configuration message, and transmits a dual connectivity configuration completion message (or an RRC connectivity reconfiguration completion message) to the base station apparatus 3-1. When receiving the dual connectivity configuration message, the base station apparatus 3-1 transmits the dual connectivity connection completion message (or a secondary cell group addition completion message) to the base station apparatus 3-2.

For example, a configuration of the radio bearer by the mobile station apparatus 1-1 for the base station apparatus 3-1 before the dual connectivity configuration is such that a logical channel 1 which corresponds to a control radio bearer 1 (control data 1) is set to be a logical channel group 1, a logical channel 2 which correspond to a control radio bearer 2 (control data 2) is set to be a logical channel group 2, and a logical channel 3 which corresponds to a data radio bearer 1 (user data 1) is set to be a logical channel group 3.

In a case where, with the dual connectivity configuration message, a radio bearer of the base station apparatus 3-2 is such that the logical channel 1 which corresponds to the data radio bearer 1 (the user data 1) is set to be the logical channel group 1, and the logical channel 2 which corresponds to the data radio bearer 2 (user data 2) is set to be the logical channel group 2, for a radio bearer of the mobile station apparatus 1-1, the radio bearer of the mobile station apparatus 1-1 for the base station apparatus 3-1 is such that the logical channel 1 which corresponds to the control radio bearer 1 (the control data 1) is set to be the logical channel group 1, the logical channel 2 which corresponds to the control radio bearer 2 (the control data 2) is set to be the logical channel group 2, and the logical channel 3 which corresponds to the data radio bearer (the user data 1) is set to be the logical channel group 3. Furthermore, in such a case, for the radio bearer of the mobile station apparatus 1-1, the radio bearer of the mobile station apparatus 1-1 for the base station apparatus 3-2 is such that a logical channel 4 which corresponds to the data radio bearer 1 (the user data 1) is set to be a logical channel group 4, and a logical channel 5 which corresponds to the data radio bearer 2 (the user data 2) is set to be a logical channel group 5.

Moreover, the mobile station apparatus 1-1 recognizes the data radio bearer 1 as a radio bearer that results from the Bearer Split. Moreover, the base station apparatus 3-1 may send information indicating whether or not the Bearer Split is separately performed on each radio bearer.

After transmitting the dual connectivity configuration completion message, the mobile station apparatus 1-1 executes the random access procedure on the base station apparatus 3-2, using the physical random access channel configuration information in the radio resource configuration information and the random access procedure configuration information. When completing the random access procedure for the base station apparatus 3-2, the mobile station apparatus 1-1 and the base station apparatus 3-2 start uplink and downlink communication.

More specifically, operation of the mobile station apparatus 1-1 is described. When receiving the dual connectivity configuration message (or the RRC connection reconfiguration message), with regard to the RRC layer of the mobile station apparatus 1-1, the mobile station apparatus 1-1 configures pieces of radio resource configuration information of the base station apparatus 3-2 for suitable layers, that is, the PHY layer, the MAC layer, the RLC layer, the PDCP layer, and the RRC layer, respectively. Furthermore, with regard to the RRC layer of the mobile station apparatus 1-1, as a configuration of the data radio bearer, the logical channel configuration information on the radio bearer and the information indicating the relationship between the radio bearer and the transmission/reception cell is configured for the PDCP layer and the RLC layer, the PDCP layer configuration information is configured for the PDCP layer, and the RLC layer configuration information is configured for the RLC layer.

Figure 4:
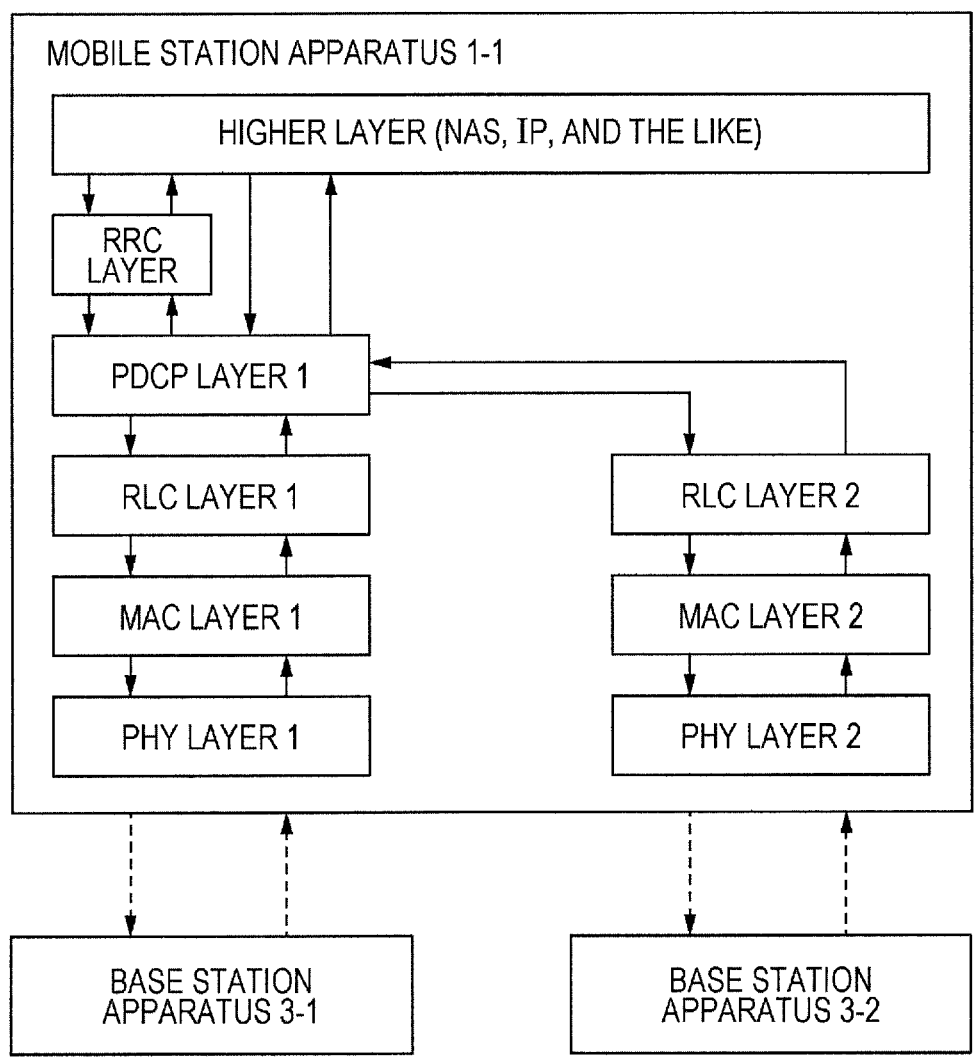
FIG. 4 is a diagram illustrating one example of the constitution of a communication protocol for the mobile station apparatus according to the embodiment of the present invention.
Figure 5:
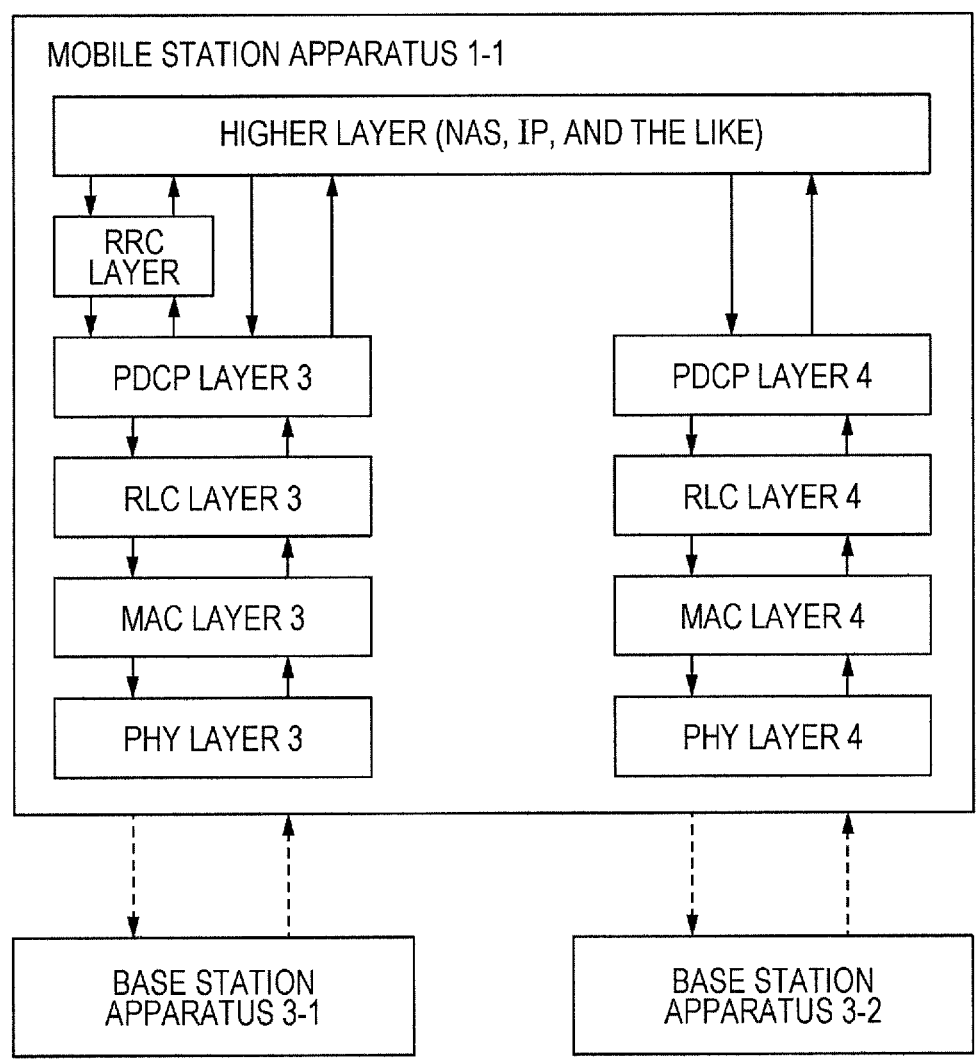
FIG. 5 is a diagram illustrating one example of a constitution of the communication protocol for the mobile station apparatus according to the embodiment of the present invention.

With regard to a constitution of a communication protocol for the mobile station apparatus 1-1 in a dual connectivity state as illustrated in FIG. 13, multiple PHY layers, multiple Mac layers, and multiple RLC layers each may be constituted to be present in a manner that corresponds to each base station apparatus. More precisely, as illustrated in FIG. 4, for the constitution of the communication protocol, the mobile station apparatus 1-1 may be constituted to have the PHY layer (a PHY layer 1), the MAC layer (a MAC layer 1), and the RLC layer (a RLC layer 1) that correspond to the base station apparatus 3-1 (or the master cell group), and the PHY layer (a PHY layer 2), the MAC layer (a MAC layer 2), and the RLC layer (an RLC layer 2) that correspond to the base station apparatus 3-2 (or the secondary cell group).

More precisely, as illustrated in FIG. 12, for the constitution of the communication protocol, the mobile station apparatus 1-1 in the dual connectivity state may be constituted to have the PHY layer (a PHY layer 3), the MAC layer (a MAC layer 3), the RLC layer (a RLC layer 3), the PDCP layer (a PDCP layer 3) that correspond to the base station apparatus 3-1 (or the master cell group), and the PRY layer (a PHY layer 4), the MAC layer (a MAC layer 4), the RLC layer (an RLC layer 4), and the PDCP layer (a PDCP layer 4) that correspond to the base station apparatus 3-2 (or the secondary cell group).

The RRC layer of the mobile station apparatus 1-1 creates the dual connectivity configuration completion message after configuring the radio resource, and provide a notification to the PDCP layer 1 of the mobile station apparatus 1-1 in order to transmit the created message to the base station apparatus 3-1. The created message is processed in the PDCP layer 1 of the mobile station apparatus 1-1, the RLC layer (the RLC layer 1) of the mobile station apparatus 1-1, which corresponds to the base station apparatus 3-1, the MAC layer (the MAC layer 1) of the mobile station apparatus 1-1, which corresponds to the base station apparatus 3-1, and the PHY layer (the PHY layer 1) of the mobile station apparatus 1-1, which corresponds to the base station apparatus 3-1, and is transmitted to the base station apparatus 3-1.

Next, the operation of the mobile station apparatus 1-1 that uses the Dual Connect is described. In a case where the uplink data occurs in the mobile station apparatus 1-1, the PDCP layer 1 of the mobile station apparatus 1-1 performs processing, such as the data encryption and the head compression, maps data to each logical channel according to the radio bearer configuration (the logical channel configuration) of the data, and transfers the processed data to the RLC layer (the RLC layer 1) of the mobile station apparatus 1-1, which corresponds to the base station apparatus 3-1 or the RLC layer (the RLC layer 2) of the mobile station apparatus 1-1, which is corresponds to the base station apparatus 3-2.

For example, in a case where the data on the control radio bearer 1 occurs, the PDCP layer 1 of the mobile station apparatus 1-1 maps the data on the control radio bearer 1 to the logical channel 1, and outputs the data to the RLC layer (the RLC layer 1) of the mobile station apparatus 1-1, which corresponds to the base station apparatus 3-1. Next, the RLC layer 1 of the mobile station apparatus 1-1 performs the data segmentation and concatenation. After the data processing in the RLC layer 1 of the mobile station apparatus 1-1, when pieces of data are accumulated (buffered) in the MAC layer (the MAC layer 1) of the mobile station apparatus 1-1, which corresponds to the base station apparatus 3-1, the MAC layer 1 of the mobile station apparatus 1-1 triggers the Buffer Status Report for the cell 1 (the base station apparatus 3-1).

In a case where the radio resource (the Physical Uplink Shared Data Channel (PUSCH)) for the cell 1 is allocated by the base station apparatus 3-1, the MAC layer 1 of the mobile station apparatus 1-1 creates the Buffer Status Report, multiplexes the Buffer Status Report and/or data on the logical channel 1, and outputs a result of the multiplexing to the PHY layer (the PHY layer 1) of the mobile station apparatus 1-1, which corresponds to the base station apparatus 3-1, the PHY layer 1 of the mobile station apparatus 1-1 transmits the result of the multiplexing to the base station apparatus 3-1, using the allocated radio resource. Then, again, in a case where the uplink transmission approval information on the cell 1 is received from the base station apparatus 3-1 and the radio resource for the cell 1 is allocated, the mobile station apparatus 1-1 transmits the remaining data to the base station apparatus 3-1.

In a case where the radio resource for the cell 1 is not allocated by the base station apparatus 3-1, the MAC layer 1 of the mobile station apparatus 1-1 triggers the Scheduling Request. In a case where the Physical Uplink Control Channel (PUCCH) is allocated to the mobile station apparatus 1-1, the MAC layer 1 of the mobile station apparatus 1-1 instructs the PHY layer 1 of the mobile station apparatus 1-1 to perform the transmission of the Scheduling Request, which uses the Physical Uplink Control Channel (PUCCH), and in a case where the Physical Uplink Control Channel (PUCCH) is not allocated to the mobile station apparatus 1-1, the MAC layer 1 of the mobile station apparatus 1-1 starts the contention based Random Access procedure.

Then, when the radio resource (the Physical Uplink Shared Data Channel (PUSCH)) for the cell 1 is allocated by the base station apparatus 3-1, the MAC layer 1 of the mobile station apparatus 1-1 creates the Buffer Status Report, multiplexes the Buffer Status Report and/or data on the logical channel 1, and outputs a result of the multiplexing to the PHY layer 1 of the mobile station apparatus 1-1, and the PHY layer 1 of the mobile station apparatus 1-1 transmits the result of the multiplexing to the base station apparatus 3-1, using the allocated radio resource.

Furthermore, in a case where data on the data radio bearer 1 that results from the Bearer Split occurs, the PDCP layer 1 of the mobile station apparatus 1-1 determines to which RLC layer of the RLC layer 1 of the mobile station apparatus 1-1 and the RLC layer 2 of the mobile station apparatus 1-1 the data is output. The PDCP layer 1 of the mobile station apparatus 1-1 determines to which RLC layer the data is output, according to an amount of data that is accumulated in each MAC layer.

Furthermore, the PDCP layer 1 of the mobile station apparatus 1-1 may determine to which RLC layer the data is output, according to a quality state of the radio link (the wireless channel). Furthermore, the PDCP layer 1 of the mobile station apparatus 1-1 may determine to which RLC layer the data is output, according to a condition that is notified by the base station apparatus 3-1.

The RLC layer, the MAC layer, and the PHY layer of the mobile station apparatus 1-1, which receive the data, process the data in the same manner, and when the radio resource is allocated, transmits the resulting data to the corresponding base station apparatus.

The mobile station apparatus 1-1 transmits data to the base station apparatus 3-2, and in a case where the RLC layer of the base station apparatus 3-2 provides an instruction (the negative response (NACK)) to retransmit the data, the RLC layer 2 of the mobile station apparatus 1-1 performs the retransmission control of the data. In a case where the number of times of retransmission reaches the maximum number of times that the RLC layer performs the transmission, which is indicated with the RLC configuration information, the RLC layer 2 of the mobile station apparatus 1-1 stops the retransmission control, and notifies the RRC layer of the mobile station apparatus 1-1 of an RLC failure (or an RLC problem) indicating that the number of times that the data is retransmitted reaches the maximum number of times that the RLC layer performs the transmission.

After notifying the RRC layer of the mobile station apparatus 1-1 of the RLC failure, the RLC layer 2 of the mobile station apparatus 1-1 may perform processing, such as destroying data whose processing is not completed in the RLC layer 2, stopping or resetting a timer associated with the RLC layer 2, or initializing or resetting various parameters.

In a case where the RLC failure is notified by the RLC layer 2 of the mobile station apparatus 1-1, the RRC layer of the mobile station apparatus 1-1 creates a message indicating the RLC failure (the RLC problem or a radio link failure) with respect with the base station apparatus 3-2, and provides the PDCP layer 1 of the mobile station apparatus 1-1 with a notification, as data destined for the base station apparatus 3-1 in order to transmit the created message. The created message is processed in the PDCP layer 1 of the mobile station apparatus 1-1, the RLC layer (the RLC layer 1) of the mobile station apparatus 1-1, which corresponds to the base station apparatus 3-1, the MAC layer 1 of the mobile station apparatus 1-1, and the PHY layer 1 of the mobile station apparatus 1-1, and is transmitted to the base station apparatus 3-1.

Furthermore, the RRC layer of the mobile station apparatus 1-1 may instruct the PDCP layer 1 of the mobile station apparatus 1-1, and the RLC layer 2 and the MAC layer 2 of the mobile station apparatus 1-1 to change a radio bearer that corresponds to the base station apparatus 3-2 to a radio bearer that corresponds to the base station apparatus 3-1. More precisely, the RRC layer of the mobile station apparatus 1-1 may configure the radio bearer that is configured only for the base station apparatus 3-2, as the radio bearer for the base station apparatus 3-1. Furthermore, for a radio bearer for which the Bearer Split is configured, the RRC layer of the mobile station apparatus 1-1 may be set to provide an instruction to release (destroy) a radio bearer that corresponds to the base station apparatus 3-2.

Furthermore, the RRC layer of the mobile station apparatus 1-1 may be set to provide an instruction to release (destroy) all radio bearers that correspond to the base station apparatus 3-2. The PDCP layer 1 of the mobile station apparatus 1-1, and the RLC layer 2 and the MAC layer 2 of the mobile station apparatus 1-1 may destroy (or release) configuration information on the radio bearer whose releasing has to be performed according to the instruction from the RRC layer of the mobile station apparatus 1-1.

Furthermore, in order to preclude the uplink transmission to the base station apparatus 3-2, the RRC layer of the mobile station apparatus 1-1 may instruct the PDCP layer 1 of the mobile station apparatus 1-1 to destroy or reestablish data for the base station apparatus 3-2. The RRC layer of the mobile station apparatus 1-1 may notify the MAC layer 2 of the mobile station apparatus 1-1 of reset of the MAC layer. The RRC layer of the mobile station apparatus 1-1 may instruct the RLC layer 2 of the mobile station apparatus 1-1 to perform the re-establishment. Moreover, the RLC layer 2 of the mobile station apparatus 1-1 may notify the MAC layer 2 of the mobile station apparatus 1-1 the reset of the MAC layer.

Moreover, in re-establishment of the PDCP layer, the PDCP layer performs initialization processing and the like of the PDCP layer. In re-establishment of the RLC layer, the RLC layer performs processing, such as destroying data whose processing is not completed in the RLC layer, stopping or resetting the timer associated with the RLC layer, or initializing or resetting various parameter.

In the MAC reset, the MAC layer performs processing, such as initializing each parameter. Specifically, the MAC layer performs processing, such as stopping various timers (for example, the timer associated with the Buffer Status Report, the timer associated with the Power Headroom Report, and the transmission timing timer) that are managed in the MAC layer, cancelling the triggering (for example, the triggering associated with the Buffer Status Report and the triggering associated with the Power Headroom Report) that is managed in the MAC layer, flushing data in a downlink reception buffer and an uplink transmission buffer that are managed by the MAC layer of the mobile station apparatus 1-1, which corresponds to the base station apparatus 3-2, deleting the preamble number and the random access channel number, stopping the random access procedure, and so forth.

Furthermore, the RRC layer of the mobile station apparatus 1-1 releases the uplink control channel and the uplink reference signal that are allocated by the base station apparatus 3-2. More precisely, the RRC layer of the mobile station apparatus 1-1 may delete the downlink wireless quality report configuration information, the uplink reference signal allocation information, and the scheduling request configuration information, which are notified by the base station apparatus 3-2, and may initialize a parameter.

Furthermore, in order not to execute the random access procedure for the base station apparatus 3-2, the RRC layer of the mobile station apparatus 1-1 may destroy the physical random access configuration information and the random access procedure configuration information, which are associated with the cell of the base station apparatus 3-2. In this manner, the mobile station apparatus 1-1 is set not to perform all uplink transmissions to the base station apparatus 3-2.

Moreover, in data retransmission control of the RLC layer (the RLC layer 1) for the base station apparatus 3-1, of the mobile station apparatus 1-1, in a case where the number of times of retransmission reaches the maximum number of times that the RLC layer transmits the data, which is indicated with the RLC configuration information, the RLC layer 1 of the mobile station apparatus 1-1 notifies the RRC layer of the mobile station apparatus 1-1 of the RLC failure (or the RLC problem) indicating that the number of times that the data is retransmitted reaches the maximum number of times that the RLC layer performs the transmission. In a case where the RLC failure is notified by the RLC layer 1 of the mobile station apparatus 1-1, the RRC layer of the mobile station apparatus 1-1 performs an RRC re-establishment procedure. Moreover, the RRC re-establishment procedure is a procedure in which communication between the base station apparatus 3-1 and the base station apparatus 3-2 is discontinued, the selection of the cell is made, and the processing that makes the connection to the selected base station apparatus is performed.

Moreover, when receiving a message indicating the radio link failure (or the RLC failure) in the base station apparatus 3-2, the base station apparatus 3-1 transmits a dual connectivity release message indicating the stopping of the Dual Connect to the mobile station apparatus 1-1, to the base station apparatus 3-2. IN a case where the dual connectivity release message is received, the base station apparatus 3-2 transfers data of the mobile station apparatus 1-1, which is present in the base station apparatus 3-2, to the base station apparatus 3-1. After the data transfer, the base station apparatus 3-2 transmits a dual connectivity release response message to the base station apparatus 3-1. Furthermore, the base station apparatus 3-2 destroys information relating to the mobile station apparatus 1-1.

The base station apparatus 3-1 transmits a dual connectivity release message (or an RRC reconfiguration message) indicating release of a cell (cell group) (deletion of a cell) of the base station apparatus 3-2, to the mobile station apparatus 1-1. When receiving the dual connectivity release message (the RRC reconfiguration message) indicating the release of the cell (cell group) (the deletion of the cell) of the base station apparatus 3-2, the mobile station apparatus 1-1 destroys the radio resource configuration information on the cell (the cell group) of the base station apparatus 3-2.

Furthermore, even in a case where quality abnormality is detected in a downlink wireless channel between the base station apparatus 3-2 and the mobile station apparatus 1-1, the mobile station apparatus 1-1 that uses the Dual Connect may be set to perform the same processing as in the case of the RLC failure.

More precisely, in the radio link between the base station apparatus 3-2 and the mobile station apparatus 1-1, in a case where the RRC layer of the mobile station apparatus 1-1 detects the radio link failure based on information from the PHY layer 2 of the mobile station apparatus 1-1, the RRC layer of the mobile station apparatus 1-1 instructs the PDCP layer 1 of the mobile station apparatus 1-1, and the RLC layer 2 and the MAC layer 2 of the mobile station apparatus 1-1 to change the radio bearer that corresponds to the base station apparatus 3-2 to the radio bearer that corresponds to the base station apparatus 3-1.

Furthermore, the RRC layer of the mobile station apparatus 1-1 instructs the PDCP layer 1 of the mobile station apparatus 1-1 to destroy or re-establish data for the base station apparatus 3-2. The RRC layer of the mobile station apparatus 1-1 notifies the MAC layer 2 of the mobile station apparatus 1-1 of the reset of the MAC layer. The RRC layer of the mobile station apparatus 1-1 instructs the RLC layer 2 of the mobile station apparatus 1-1 to perform the re-establishment. The RRC layer of the mobile station apparatus 1-1 may destroy the physical random access configuration information and the random access procedure configuration information, which are associated with the cell of the base station apparatus 3-2.

Moreover, this is also true for the operation of the mobile station apparatus 1-1 in the case of the Dual Connect as illustrated in FIG. 12. More precisely, in a case where the RLC failure is notified by the RLC layer 4 of the mobile station apparatus 1-1, the RRC layer of the mobile station apparatus 1-1 instructs the PDCP layer 4, the RLC layer 4, and the MAC layer 4 of the mobile station apparatus 1-1 to change the radio bearer that corresponds to the base station apparatus 3-2 to the radio bearer that corresponds to the base station apparatus 3-1.

Furthermore, the RRC layer of the mobile station apparatus 1-1 instructs the PDCP layer 4 of the mobile station apparatus 1-1 to destroy or re-establish the data for the base station apparatus 3-2. The RRC layer of the mobile station apparatus 1-1 instructs the RLC layer 4 of the mobile station apparatus 1-1 to perform the re-establishment. The RRC layer of the mobile station apparatus 1-1 notifies the MAC layer 4 of the mobile station apparatus 1-1 of the reset of the MAC layer.

By doing this, the mobile station apparatus 1-1 can perform the uplink data transmission on a suitable cell (or base station apparatus). Furthermore, the base station apparatus 3-1 and the base station apparatus 3-2 can cause the mobile station apparatus 1-1 to perform uplink data transmission control for a suitable cell (or base station apparatus).

The embodiments of the invention are described in detail above referring to the drawings, but specific constitutions are not limited to those described above and it is possible that various design amendments and the like are made within a scope that does not depart from the gist of the present invention.

Furthermore, according to the embodiment, the mobile station apparatus is described as one example of a terminal device or a communication device, but it goes without saying that the invention in the present application is not limited to this, and can be applied also to a terminal device or a communication device in a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

Furthermore, for convenience of description, the mobile station apparatus 1-1, the base station apparatus 3-1 and the base station apparatus 3-2 according to the embodiment are described referring to the functional block diagrams, but a program for realizing a function of each unit of the mobile station apparatus 1-1, the base station apparatus 3-1, and the base station apparatus 3-2, or some of these functions may be recorded on a computer-readable recording medium, a computer system may be caused to read and run the program recorded on the recording medium, and thus control of the mobile station apparatus or the base station apparatus may be performed. Moreover, the "computer system" here is defined as including an OS and hardware components such as a peripheral device.

Furthermore, the "computer-readable recording medium" refers to a portable medium, such as a flexible disk, a magneto-optical disk, a ROM, and a CD-ROM, and a storage device, such as a hard disk, that is built into the computer system. Moreover, the "computer-readable recording media" is defined as including a medium that dynamically retains the program for a short period of time, such as a communication line that is available when transmitting the program over a network such as the Internet or over a communication line such as a telephone line, and a medium that retains the program for a fixed period of time, such as a volatile memory within the computer system, which functions as a server or a client in a case where the program is retained dynamically for a short period of time. Furthermore, the program described above may be one for realizing some of the functions described above and additionally may be one that can realize the functions described above in combination with a program that is already recorded in the computer system.

Furthermore, each functional block that is used according to each embodiment described above may be realized as an LSI, which is typically an integrated circuit. Each functional block may be individually built into a chip, and some or all functional blocks may be integrated into a chip. Furthermore, a technique for the integrated circuit is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is possible that an integrated circuit to which such a technology is applied is also used.

The embodiment of the present invention is described above in detail referring to the drawings, but the specific constitutions are not limited to the embodiment and a design and the like within a scope that does not depart from the gist of the present invention fall within the scope of claims as well.

INDUSTRIAL APPLICABILITY

According to an aspect of the present invention, for example, the present invention finds application in a wireless communication system, a terminal device, a wireless communication system, an integrated circuit, a processing method, and the like, in all of which it is indispensable to make efficient data transmission control possible.

DESCRIPTION OF REFERENCE NUMERALS

1-1 to 1-3 MOBILE STATION APPARATUS
3-1 BASE STATION APPARATUS IN MACRO CELL
3-2 BASE STATION APPARATUS IN SMALL CELL
101, 221 UPLINK DATA PROCESSING UNIT
121, 201 DOWNLINK DATA PROCESSING UNIT
103-1, 103-2, 219, 317 UPLINK CONTROL UNIT
105-1, 105-2, 205, 303 TRANSMISSION DATA STORAGE UNIT
107-1, 107-2, 207, 305 TRANSMISSION HARQ PROCESSING UNIT
109-1, 109-2, 209, 307 TRANSMISSION PROCESSING UNIT
111-1, 111-2, 211, 309 WIRELESS UNIT
113-1, 113-2, 213, 311 RECEPTION PROCESSING UNIT
115-1, 115-2, 215, 313 RECEPTION HARQ PROCESSING UNIT
117-1, 117-2, 217, 315 MAC INFORMATION EXTRACTION UNIT
119-1, 119-2, 203, 301 DOWNLINK CONTROL UNIT
123-1, 123-2, 223, 319 PHY CONTROL UNIT
125-1, 125-2, 225, 321 MAC CONTROL UNIT
127, 227, 323 RRC CONTROL UNIT
229, 325 INTER-BASE STATION APPARATUS COMMUNICATION UNIT
231, 327 MME COMMUNICATION UNIT
233 GW COMMUNICATION UNIT

The invention claimed is:

1. A terminal apparatus using a master cell group and a secondary cell group, the terminal apparatus comprising:
a receiver configured or programmed to receive a message including a radio bearer configuration information via the master cell group; and a controller configured or programmed to, in a case that a number of Radio Link Control retransmissions reaches a maximum number at a radio link control of the secondary cell group, reset a MAC of the terminal apparatus, the MAC corresponding to the secondary cell group; and, a transmitter configured or programmed to, in the case that the number of Radio Link Control retransmissions reaches the maximum number at the secondary cell group, transfer a message indicating a detection of a radio link failure for the secondary cell group via the master cell group.

2. A communication method for a terminal apparatus using a master cell group and a secondary cell group, the communication method comprising:

receiving a message including a radio bearer configuration information via the master cell group; and in a case that a number of Radio Link Control retransmissions reaches a maximum number at a radio link control of the secondary cell group, resetting a MAC of the terminal apparatus, the MAC corresponding to the secondary cell group; and, in the case that the number of Radio Link Control retransmissions reaches the maximum number at the secondary cell group, transferring a message indicating a detection of a radio link failure for the secondary cell group via the master cell group.

3. An integrated circuit mountable on a terminal apparatus using a master cell group and a secondary cell group, the integrated circuit causing the terminal apparatus to perform at least functions of:

receiving a message including a radio bearer configuration information via the master cell group; and in a case that a number of Radio Link Control retransmissions reaches a maximum number at a radio link control of the secondary cell group, resetting a MAC of the terminal apparatus, the MAC corresponding to the secondary cell group; and, in the case that the number of Radio Link Control retransmissions reaches the maximum number at the secondary cell group, transferring a message indicating a detection of a radio link failure for the secondary cell group via the master cell group.

* * * * *